(12) United States Patent
Barfield, Jr. et al.

(10) Patent No.: US 9,258,409 B1
(45) Date of Patent: Feb. 9, 2016

(54) DETERMINING THAT A USER IS IN A VEHICLE OR DRIVING A VEHICLE BASED ON SENSOR DATA GATHERED BY A USER DEVICE

(71) Applicant: Verizon Patent and Licensing Inc., Arlington, VA (US)

(72) Inventors: James Ronald Barfield, Jr., Atlanta, GA (US); Stephen Christopher Welch, Atlanta, GA (US); Thomas Steven Taylor, Atlanta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/445,748

(22) Filed: Jul. 29, 2014

(51) Int. Cl.
*H04W 4/04* (2009.01)
*H04M 1/725* (2006.01)
*H04W 4/02* (2009.01)
*H04W 8/22* (2009.01)

(52) U.S. Cl.
CPC ............ *H04M 1/72577* (2013.01); *H04W 4/02* (2013.01); *H04W 8/22* (2013.01)

(58) Field of Classification Search
CPC ................ H04M 1/72577; H04M 1/72563; H04M 1/72569; H04M 2250/12; H04M 2242/30; H04M 3/38; H04M 3/42348; H04M 3/2281; H04W 4/02; H04W 4/027; H04W 48/04; H04W 48/02; H04W 64/00
See application file for complete search history.

(56) References Cited

U.S. PATENT DOCUMENTS

| 5,852,630 | A * | 12/1998 | Langberg et al. | 375/219 |
|---|---|---|---|---|
| 8,290,480 | B2 * | 10/2012 | Abramson et al. | 455/418 |
| 8,401,589 | B2 * | 3/2013 | Liu et al. | 455/552.1 |
| 8,502,642 | B2 * | 8/2013 | Vitito | 340/5.21 |
| 8,565,838 | B2 * | 10/2013 | Nicolini | 455/569.2 |
| 8,594,705 | B2 * | 11/2013 | Osann, Jr. | 455/456.3 |
| 8,666,382 | B2 * | 3/2014 | Silver | 455/418 |
| 8,676,268 | B2 * | 3/2014 | Riggs et al. | 455/565 |
| 8,718,536 | B2 * | 5/2014 | Hannon | 455/1 |
| 8,812,065 | B2 * | 8/2014 | Miller et al. | 455/575.9 |
| 8,971,927 | B2 * | 3/2015 | Zhou et al. | 455/456.3 |
| 8,994,492 | B2 * | 3/2015 | Farhan et al. | 340/3.1 |
| 9,020,482 | B2 * | 4/2015 | Jones | 455/418 |
| 2011/0021234 | A1 * | 1/2011 | Tibbitts et al. | 455/517 |

\* cited by examiner

*Primary Examiner* — Siu Lee

(57) ABSTRACT

A device may receive sensor data regarding a user device; and determine, based on the sensor data, that a user of the user device is in a vehicle or driving the vehicle. When determining that the user of the user device is in the vehicle or driving the vehicle, the device may compare the sensor data, received from the user device, with a reference dataset that includes reference data associated with users being present in or driving a vehicle, or determine that a value of a measurement, received as part of the sensor data, satisfies a threshold that is related to whether the user is in the vehicle or driving the vehicle. The device may output a particular control instruction to the user device based on determining that the user is in the vehicle or is driving the vehicle.

20 Claims, 16 Drawing Sheets

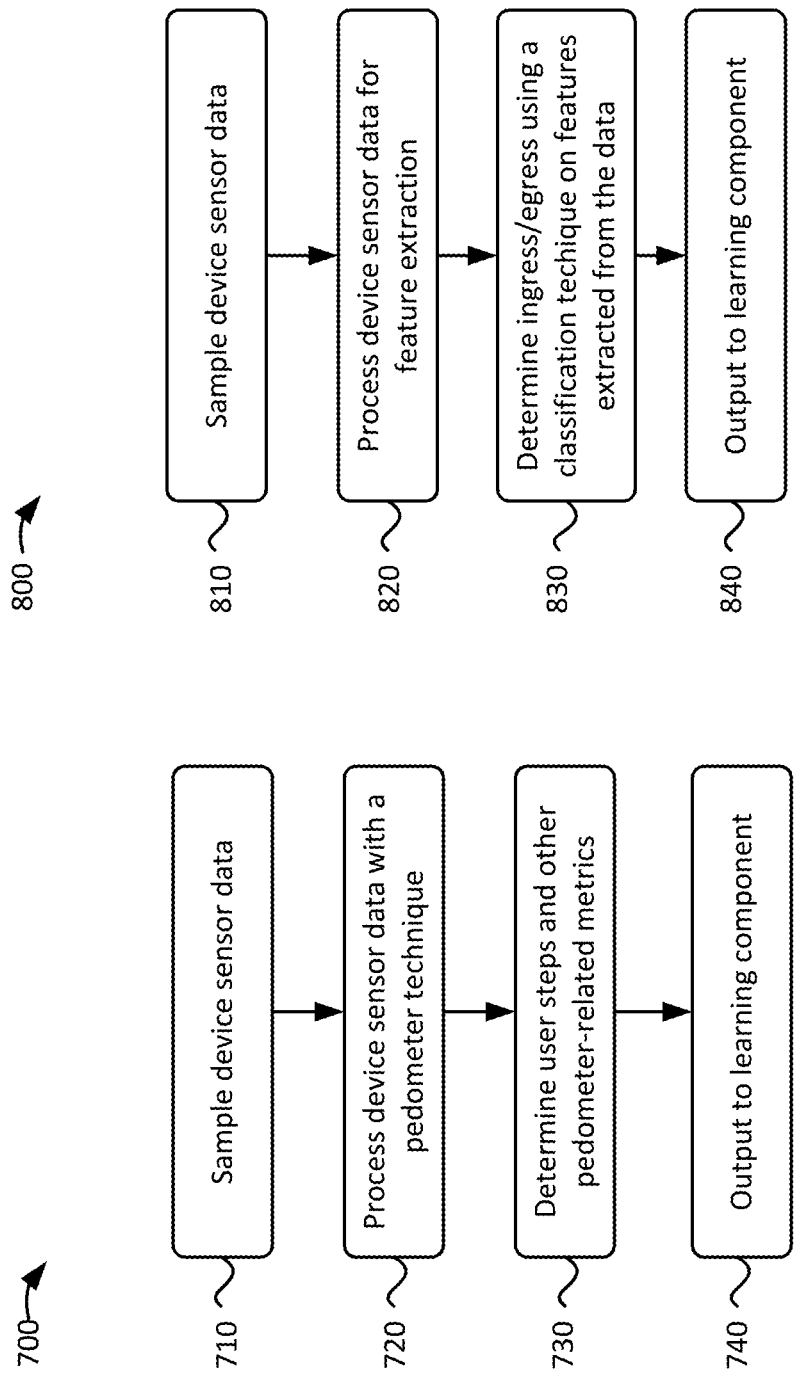

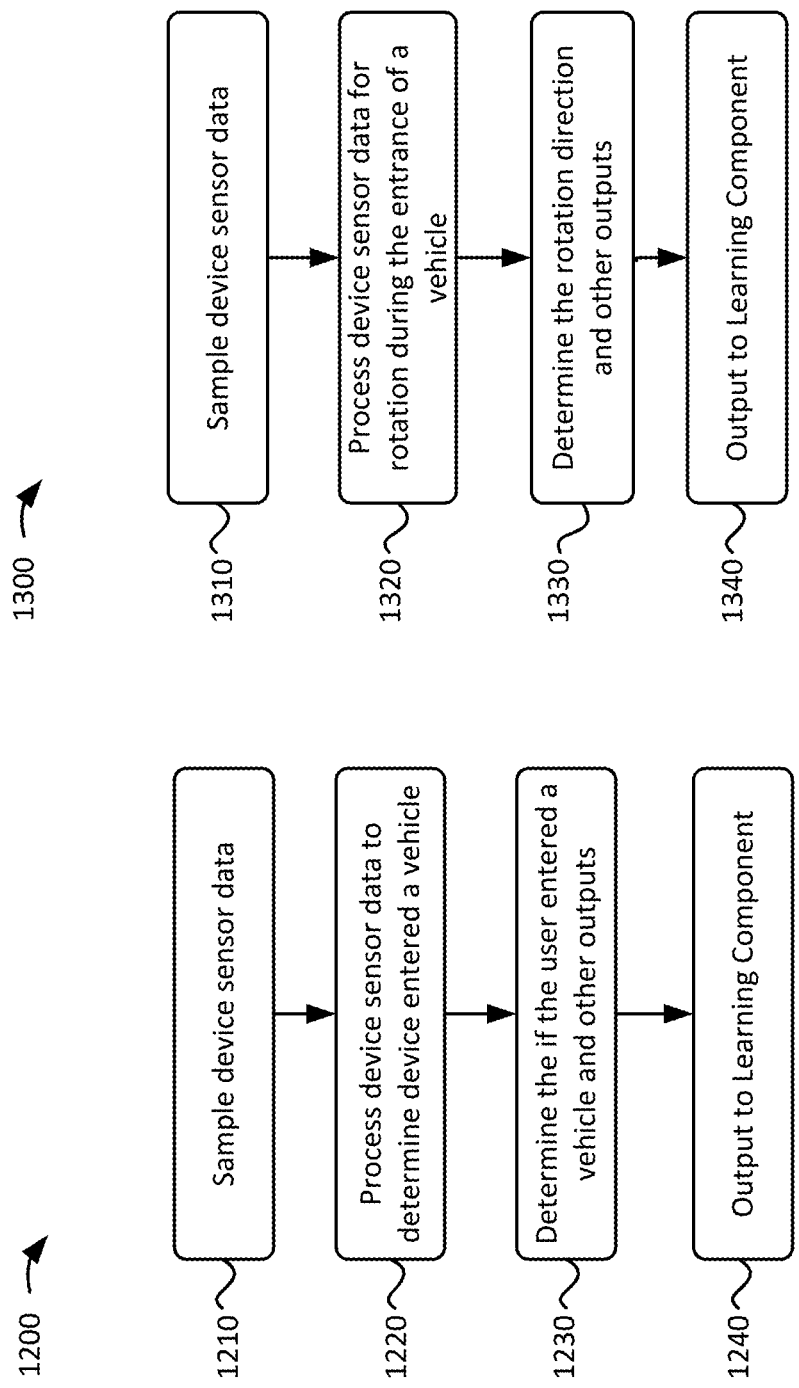

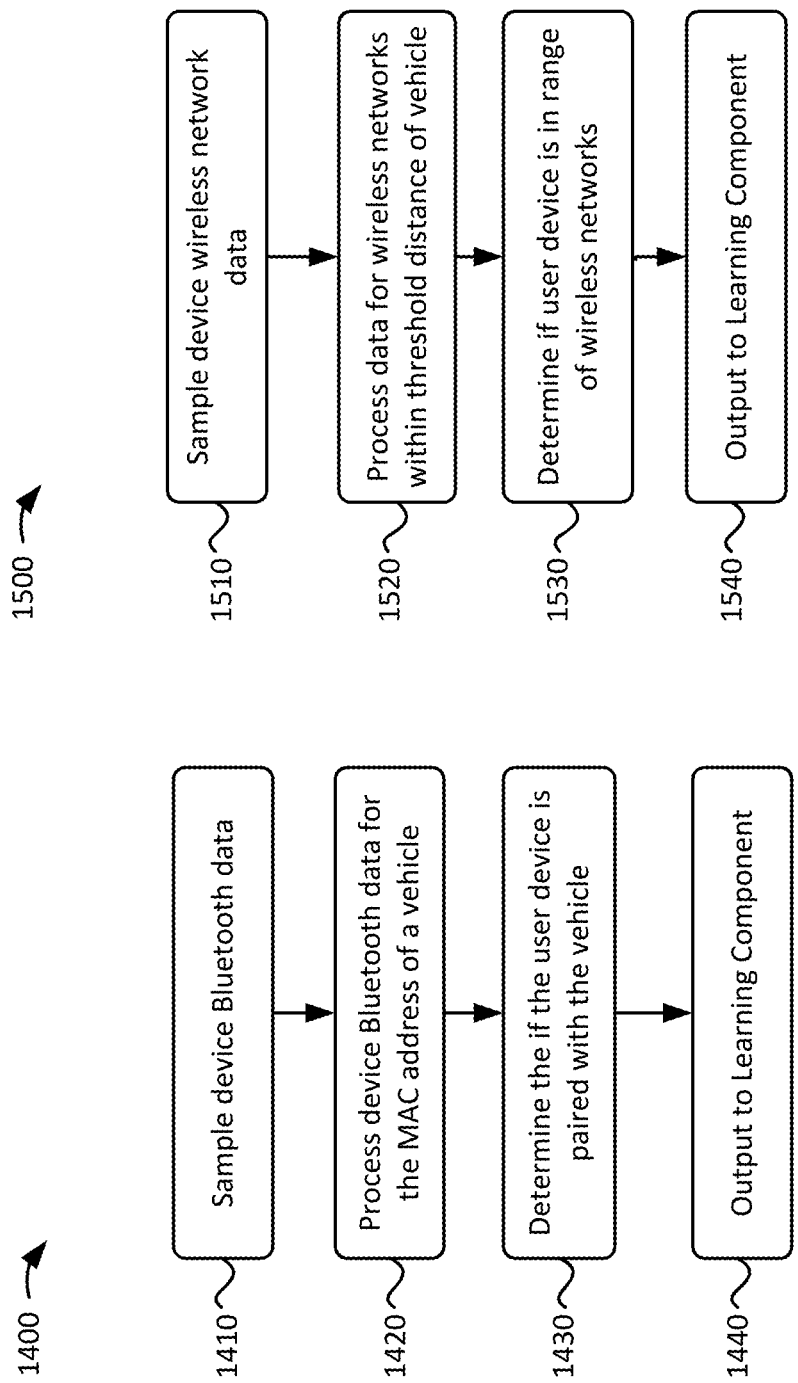

DETERMINING THAT A USER IS IN A VEHICLE OR DRIVING A VEHICLE BASED ON SENSOR DATA GATHERED BY A USER DEVICE

BACKGROUND

Vehicle usage information is sometimes collected to aid in analysis (e.g., an analysis of driver habits, driver routines, etc.). Vehicle usage information may sometimes be used for insurance rating purposes and/or for some other purpose. Vehicle usage information can be determined via location identification techniques performed by a user device.

BRIEF DESCRIPTION OF THE DRAWINGS

FIG. 7 illustrates a flowchart of an example process for determining whether a user is walking to a vehicle based on sensor data;

FIG. 8 illustrates a flowchart of an example process for determining user vehicle ingress and/or egress using a classification technique;

FIG. 12 illustrates a flowchart of an example process for determining that the user has entered a vehicle, and which side of the vehicle the user has entered;

FIG. 13 illustrates a flowchart of an example process for determining that the user has entered a vehicle, and an orientation of a user device when the user has entered the vehicle;

FIG. 14 illustrates a flowchart of an example process for determining that the user has entered a vehicle based on Bluetooth data;

FIG. 15 illustrates a flowchart of an example process for determining that the user has entered a vehicle based on wireless network information;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may determine whether a user is in a vehicle, and may further determine whether the user is driving the vehicle. In some implementations, sensor data, gathered by a user device, may be used to determine whether the user in the vehicle and/or whether the user is driving the vehicle. Based on determining that the user is in the vehicle, location identification hardware and/or location tracking software processes on the user device may be activated in order to determine vehicle usage information. As such, the location information hardware and/or location identification software processes may be active only when needed, thereby reducing power consumption on the user device. In some implementations, particular functions of the user device may be disabled based on determining that the user is driving the vehicle, thereby preventing use of the user device by the driver and improving driver safety.

Figure 1:
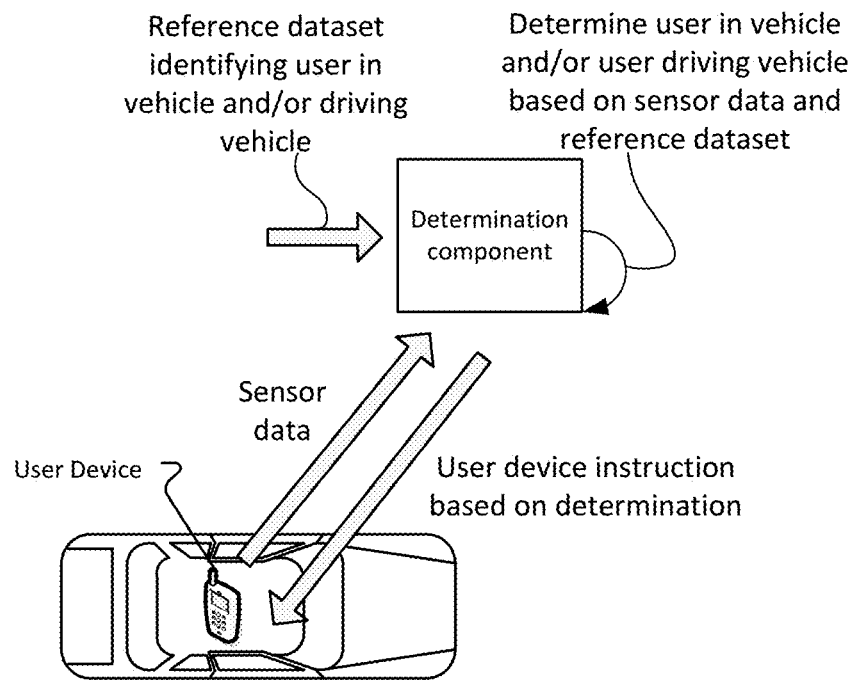
FIG. 1 illustrates an example overview of an implementation described herein.

FIG. 1 illustrates an example overview of an implementation described herein. As shown in FIG. 1, a determination component may receive sensor data from a user device (e.g., accelerometer data, gyroscope data, magnetometer data, etc.). Further, the determination component may receive a reference dataset. The reference dataset may identify values and/or measurements associated with the sensor data that indicate whether a user of the user device is located in a vehicle and/or whether the user is driving the vehicle. For example, the reference dataset may identify values of accelerometer data, gyroscope data, magnetometer data, barometer data, location data, and/or some other type of data that indicates whether the user located in a vehicle and whether the user is driving the vehicle. In some implementations, the reference dataset may be preloaded on the determination component and may be based on experimental data. Additionally, or alternatively, the reference dataset may be generated by a learning component that identifies particular ranges of values indicating whether the user is in the vehicle and/or driving the vehicle. As described herein, the term "measurement" may refer to a raw sensor value, a calculated value based on multiple raw sensor values, or a calculated value based on multiple permutations of a function.

Based on the sensor data, received from the user device, and the reference dataset, the determination component may determine whether the user is in the vehicle and/or whether the user is driving the vehicle. As an example, the determination component may determine that a user is in the vehicle and driving the vehicle by determining that the user is in a front seat of the vehicle and in a driver side seat of the vehicle (and, thus, in the front driver side seat). For example, the determination component may determine that the user is in a front seat of the vehicle based on magnetometer measurements that identify that the user in the front seat of the vehicle (e.g., since the magnetometer measurements may be substantially different based on a proximity of the user to the engine of the vehicle). The determination component may identify that the user is in a driver side seat of the vehicle when gyroscope data indicates that the user turned a particular direction to fasten a seatbelt (e.g., indicating that the user was in a driver side seat). Additionally, or alternatively, the determination component may identify that the user in the driver seat when a vehicle diagnostics system indicates that no passengers are present in the vehicle. As described in greater detail below, the determination component may determine whether the user in a vehicle and/or driving a vehicle based on other information.

If the determination component determines that the user is in the vehicle and/or driving the vehicle, the determination component may output a particular instruction to the user device. For example, the determination component may direct the user device to power on location tracking hardware on the user device, such as global positioning system (GPS) hardware and/or some other type of hardware (e.g., in order to obtain vehicle usage information, which may aid in an analysis). In some implementations, the determination component may also determine that the user has exited the vehicle based on sensor data received from the user device. The determination component may direct the user device to power off the location tracking hardware when the user is no longer in the vehicle. As such, the user device may power on the location tracking hardware only when needed, thereby reducing power consumption on the user device.

The information, stored and/or obtained by the determination component and/or other devices, may be stored and/or collected on an "opt-in" basis. In some implementations, a user may be given the opportunity to review information (such as location information, sensor measurements, etc.) that has been collected, regarding or on behalf of the user, and to delete the information and/or make the information unavailable for use. In some implementations, the user may have the opportunity to "opt out," in which case the determination component may cease receiving and/or storing information regarding the user, and may delete any existing information regarding the user. Further, the user may have the option to share the information with individual third parties (such as payment processors, advertisers, etc.), or to refrain from sharing the information with any or all parties.

Figure 2:
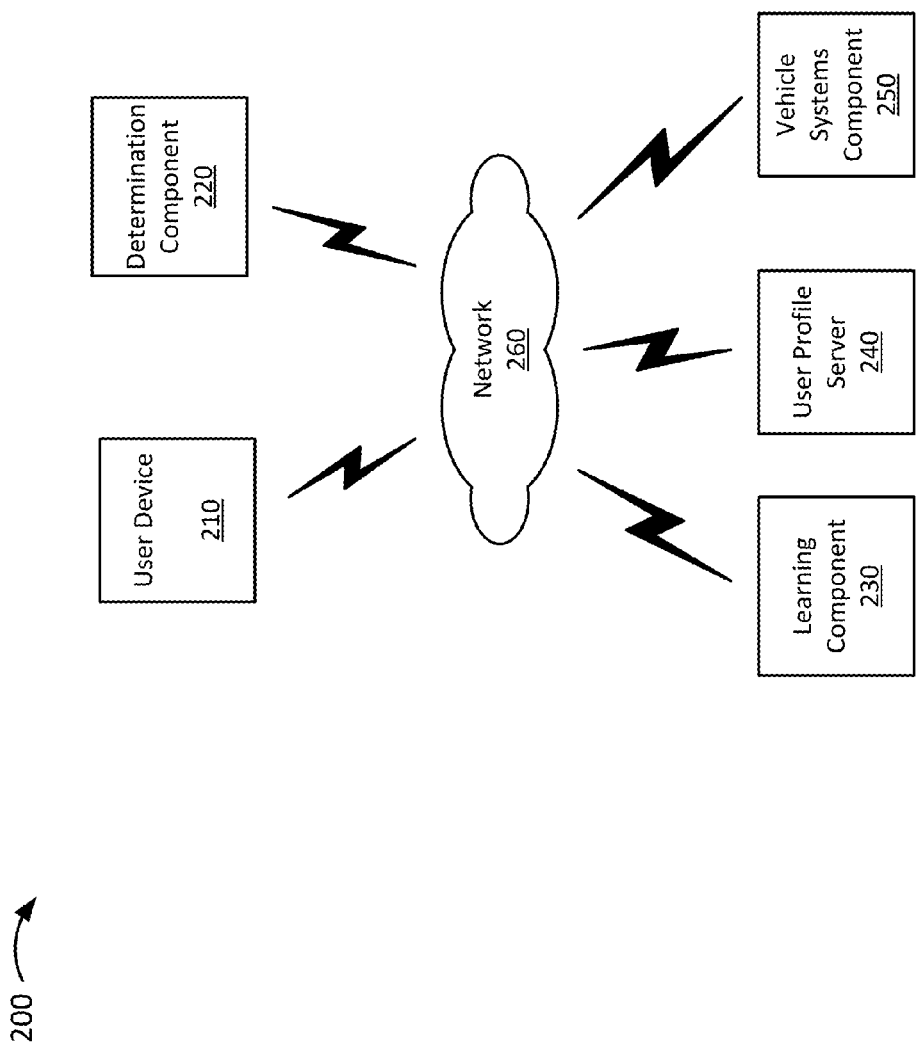
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, determination component 220, learning component 230, user profile server 240, vehicle systems component 250, and network 260.

User device 210 may include a device capable of communicating via a network, such as network 260. For example, user device 210 may correspond to a mobile communication device (e.g., a smart phone or a personal digital assistant (PDA)), a wearable computer device (e.g., a smart watch, smart glasses, or the like). In some implementations, user device 210 may include one or more sensor devices (e.g., an accelerometer, a gyroscope, a barometer, a magnetometer, a biometrics sensor, and/or some other type of sensor). Additionally, or alternatively, user device 210 may include location identification hardware (e.g., GPS hardware), communications hardware (e.g., a cellular radio, a network adapter, a Bluetooth radio, etc.), a microphone, and/or some other type of hardware. User device 210 may output sensor data to determination component 220 and/or learning component 230. In some implementations, sensor data may include raw data gathered by sensor devices of user device 210, and/or data gathered by other hardware associated with user device 210.

Determination component 220 may include one or more computing devices, such as a server device or a collection of server devices. Additionally, or alternatively, determination component 220 may be implemented via hardware circuitry and/or software logic running on user device 210 and/or external to user device 210. In some implementations, determination component 220 may receive sensor data from user device 210 and determine whether a user of user device 210 is located in a vehicle and/or whether the user is a driver of the vehicle. Determination component 220 may make these determinations by comparing information from the received sensor data with information in a reference dataset that indicates whether the user is in the vehicle and/or whether the user is driving the vehicle. In some implementations, determination component 220 may be preloaded with the reference dataset (or a portion of the reference dataset). Additionally, or alternatively, determination component 220 may receive the reference dataset (or a portion of the reference dataset) from learning component 230. For example, learning component 230 may output a portion of the reference dataset that indicates that a user is in a vehicle. Determination component 220 may be preloaded with a portion of the reference dataset that indicates that the user is driving the vehicle. Additionally, or alternatively, learning component 230 may output a reference dataset that indicates whether a user is in the vehicle and further indicates whether the user is driving the vehicle. Additionally, or alternatively, the learning component 230 may be used to determine when a user has exited the vehicle based on a reference dataset that indicates when a user exited the vehicle.

Based on determining that the user is in the vehicle and/or determining that the user is the driver of the vehicle, determination component 220 may direct user device 210 to power on location identification hardware and/or begin location identification software processes. Additionally, or alternatively, based on determining that the user is in the vehicle and/or determining that the user is the driver of the vehicle, determination component 220 may direct user device 210 to perform another function, and/or output particular sensor data. For example, determination component 220 may direct user device 210 to output additional sensor data that may be used by determination component 220 to determine an orientation with respect to an associated vehicle's coordinate axes during driving, determine a measure of aggressive driving, and/or classify driving habits at different points during a trip, (e.g. aggressive/normal stops, fast/normal accelerations, aggressive/normal turns), and/or classify road topography during driving, (e.g., uneven or rough roadways surfaces).

In some implementations, determination component 220 may determine that a user has exited a vehicle to determine a trip duration and a trip length (e.g., a time and distance between when the user has entered the vehicle and when the user has exited the vehicle) for payment calculation of cab fares. Determination component 220 may communicate with vehicle systems (e.g., based on determining that the user has entered the vehicle) to activate or modify particular vehicle functions and/or settings, such as entertainment system settings (e.g., music and/or video settings), seat position settings, activation of traffic reporting functions, activation of a vehicle driving mode that causes user device 210 to block access to particular functions to reduce distracted driving, etc.

In some implementations, determination component 220 may communicate with vehicle systems associated with a driverless vehicle to activate or modify particular vehicle functions and/or settings, such as the activation of driverless mode and/or the activation of some other function. For example, determination component 220 may communicate with vehicle systems associated with a vehicle (e.g., based on determining that the user has entered the vehicle) to activate traffic reporting functions for traffic probe or measurement purposes, such as breadcrumb tracking to adjust real time traffic or routing information, set vehicle speed settings (e.g. using current vehicle location and speed limit data at the current location, historical trip speed or based on real time alerts), etc. In some implementations, determination component 220 may determine a measure of driver risk based on usage of user device 210 while the user is in the vehicle (e.g., based on calling activity, messaging activity, web browsing activity, etc.), Additionally, or alternatively, determination component 220 may determine a measure of driver risk based determining that the user has entered the vehicle and based on additional sensor data, received from user device 210. For example, determination component 220 may receive sensor data indicating whether the user may be impaired or falling asleep while driving, (e.g., sensor data indicating that the user has intoxicated based on biometric sensors, or indicating that user may be at risk of falling asleep based on heart-rate measurements, facial recognition data, etc.). Additionally, or alternatively, determination component 220 may determine a measure of driver risk based on a time of day. When the measure or driver risk satisfies a particular threshold, determination component 220 may provide an alert and/or communicate with vehicle systems to disable the vehicle. In some implementations, determination component 220 may communicate with external systems (e.g., based on determining that the user has entered the vehicle and/or is driving the vehicle) to activate locational alerts, activate a service to provide coupons and/or promotions associated with surrounding merchants, etc.

In some implementations, determination component 220 may direct user device 210 to power off the location identification hardware and/or discontinue location identification software processes when determining that a user is no longer in a vehicle. In some implementations, determination component 220 may direct user device 210 to lock access to particular functions based on determining that determination component 220 is the driver of the vehicle. In some implementations, determination component 220 may direct user device 210 to unlock access to particular services (e.g., after have being locked) after determining that the user has exited the vehicle, and/or determining that a passenger of the vehicle is using user device 210.

Learning component 230 may include one or more computing devices, such as a server device or a collection of server devices. Additionally, or alternatively, learning component 230 may be implemented via hardware circuitry and/or software logic running on user device 210 and/or external to user device 210. Learning component 230 may determine that a user is in a vehicle based on location information received from user device 210 (e.g., when location identification hardware and/or location identification software processes are in operation). Learning component 230 may then generate a reference dataset that indicates that the user is driving a vehicle and/or driving the vehicle. As an example, learning component 230 may generate a reference dataset identifying particular accelerometer measurements, gyroscope measurements, magnetometer measurements, audio data, Bluetooth devices connected to user device 210, and/or some other information gathered at the time that a user entered a vehicle. Learning component 230 may output the reference dataset so that determination component 220 may determine whether a user is in a vehicle and/or driving the vehicle when location identification hardware and/or software of user device 210 are not in operation.

User profile server 240 may include one or more computing devices, such as a server device or a collection of server devices. In some implementations, user profile server 240 may store information identifying a calendar associated with the user. Additionally, or alternatively, user profile server 240 may store information identifying a user's habits and/or travel patterns. Additionally, or alternatively, user profile server 240 may store other information regarding the user. In some implementations, user profile server 240 may output information identifying that a user may be traveling in a vehicle. For example, user profile server 240 may output information from a calendar associated with the user (e.g., information indicating an event at a particular location at a particular time). Based on such information, learning component 230 may determine that the user may be traveling in a vehicle.

Vehicle systems component 250 may include an on-board diagnostics (OBD) system, such as an OBD II system, and/or other type of vehicle data system. In some implementations, vehicle systems component 250 may output, to learning component 230, information indicating that an associated vehicle has been started, information indicating whether a passenger is present in the vehicle (e.g., based on weight sensors), information indicating that vehicle systems component 250 is in communication with user device 210, and/or some other information. As described above, vehicle systems component 250 may receive instructions from determination component 220 (e.g., when determination component 220 determines that a user is in a vehicle and/or driving the vehicle). For example, vehicle systems component 250 may receive instructions to perform a function and/or modify settings (e.g., seat position settings, entertainment system settings, driverless settings, such as settings, routing information, etc.). Additionally, or alternatively, vehicle systems component may receive an instruction to deactivate driving functions when determination component 220 determines that a measure of risk, associated with the driver, has satisfied a particular threshold.

Network 260 may include one or more wired and/or wireless networks. For example, network 260 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 260 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
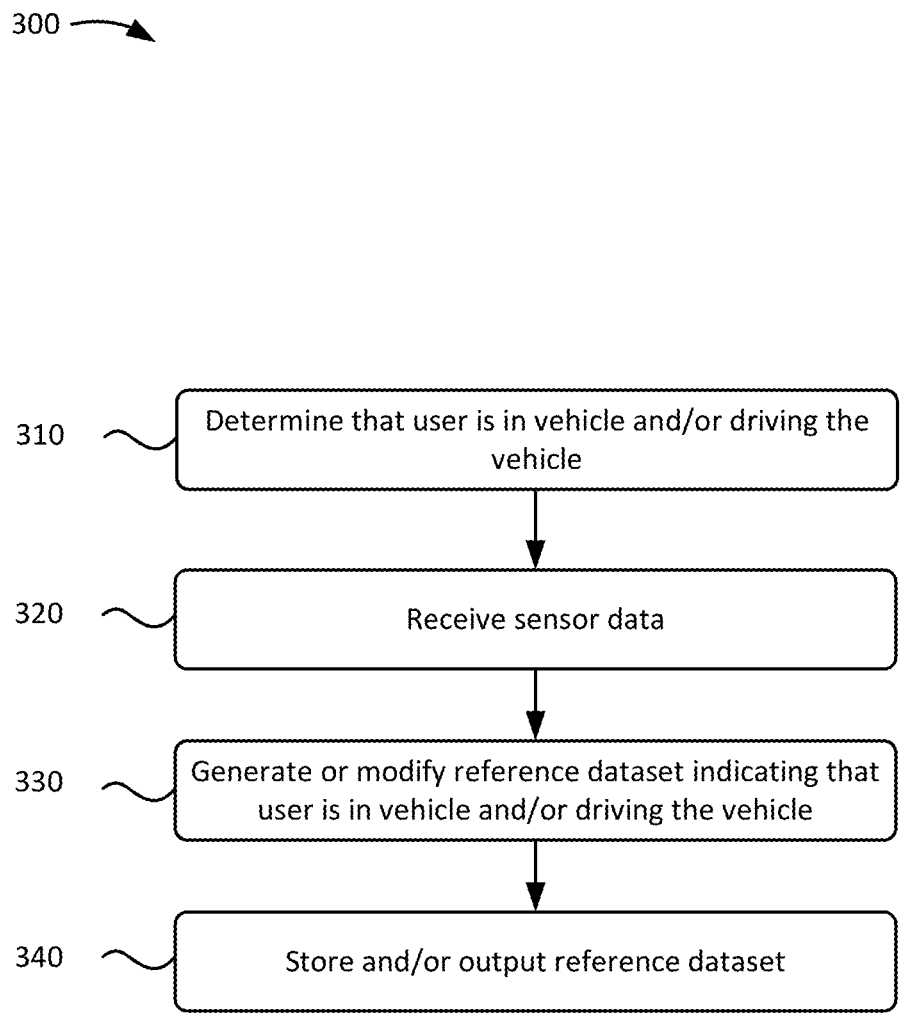
FIG. 3 illustrates a flowchart of an example process for generating a reference dataset having information indicative of whether a user is in a vehicle and/or driving the vehicle.

FIG. 3 illustrates a flowchart of an example process 300 for generating a reference dataset having information indicative of whether a user is in a vehicle and/or driving the vehicle. In some implementations, process 300 may be performed by learning component 230. In some implementations, some or all of blocks of process 300 may be performed by one or more other devices.

As shown in FIG. 3, process 300 may include determine that a user is in a vehicle and/or driving the vehicle (block 310). For example, learning component 230 may determine that the user is in the vehicle and/or driving the vehicle based on information received from user device 210, user profile server 240, and/or another source. As an example, learning component 230 may receive application activity information for user device 210 indicating that a navigation application on user device 210 is running (e.g., indicating that the user may be in the vehicle). As another example, learning component 230 may receive user profile information from user profile server 240 indicating that the user may be in a vehicle. As described above, user profile server 240 may store user profile information that may indicate the user may be traveling in a vehicle (e.g., based on calendar information, information identifying the user's routine commute, the user's travel habits, etc.).

In some implementations, each factor indicating that the user may be in the vehicle (e.g., the application activity information, the user profile information etc.) may be assigned a value, and the values may be combined to generate a score. For example, the values may be added, subtracted, multiplied, averaged, etc., in order to generate the score. In some implementations, the values for different factors may be weighted.

If the score exceeds a first threshold, learning component 230 may determine that the user is in the vehicle. If the score exceeds a second threshold (e.g., a threshold that is less than the first threshold), learning component 230 may confirm whether the user is in the vehicle. For example, learning component 230 may confirm whether the user is in the vehicle based on device information of devices within communication range of user device 210 (e.g., MAC addresses of Bluetooth devices and/or other devices that are known to be associated with a vehicle). Additionally, or alternatively, learning component 230 may confirm whether the user in the vehicle based on some other technique and/or information. For example, learning component 230 may confirm whether the user in the vehicle by determining whether user device 210 is traveling greater than a particular threshold speed, which may be determined based on location information of user device 210.

In order to obtain the location information for user device 210, learning component 230 may direct user device 210 to power on location identification hardware and/or begin location identification software processes based on receiving information indicating that the user may be in the vehicle. For example, learning component 230 may direct user device 210 to power on GPS hardware, a cellular radio, and/or other hardware that may be used to determine the location of user device 210. Additionally, or alternatively, learning component 230 may direct user device 210 to begin executing location identification software processes. User device 210 may then output location information to learning component 230.

In some implementations, learning component 230 may not determine scores, and may not direct user device 210 to power on location identification hardware and/or begin location identification software processes when location identification hardware and/or software processes are already in operation and when location information of user device 210 is outputted to learning component 230. For example, user device 210 may be currently outputting location information when a mapping and/or navigation application and/or similar application is running.

Based on receiving the location information (e.g., after directing user device 210 to power on location identification hardware and/or begin location identification software processes, or when user device 210 is already providing location information), learning component 230 may determine whether user device 210 is in a vehicle. For example, based on the location information, learning component 230 may determine a traveling speed of user device 210. If the traveling speed exceeds a particular threshold, learning component 230 may determine that the user of user device 210 is in the vehicle.

In some implementations, learning component 230 may determine that a user is in the vehicle and/or driving the vehicle based on information outputted by vehicle systems component 250. For example, vehicle systems component 250 may output information that indicates that user device 210 is in communication with vehicle systems component 250 (and hence, that user device 210 is located in the vehicle associated with vehicle system component 250). In some implementations, learning component 230 may determine that the user of user device 210 is driving the vehicle when vehicle systems component 250 outputs information indicating that no passengers are present.

Process 300 may further include receiving sensor data (block 320). For example, learning component 230 may receive sensor data from user device 210 based on determining that the user is in the vehicle and/or driving the vehicle. In some implementations, learning component 230 may receive sensor data from an accelerometer, gyroscope, magnetometer, barometer, and/or some other sensor device. Additionally, or alternatively, learning component 230 may receive information from communications hardware of user device 210 (e.g., location information and/or network information, such as network names, from a WiFi network adapter; network information, such as Media Access Control (MAC) addresses, from a Bluetooth radio, etc.). Additionally, or alternatively, learning component 230 may receive audio information from a microphone device of user device 210. Additionally, or alternatively, learning component 230 may receive image data from a camera device of user device 210 (e.g., images of objects associated with the interior of a vehicle). Additionally, or alternatively, learning component 230 may receive location information from user device 210.

In some implementations, the sensor data may identify conditions under which a user enters a vehicle and/or drives the vehicle. As described in greater detail below, determination component 220 may determine whether a user is in a vehicle and/or driving the vehicle based on the reference dataset, and even when location identification hardware and/or location identification software processes on user device 210 are not in operation.

Process 300 may further include generating or modifying a reference dataset indicating that the user is in the vehicle and/or driving the vehicle (block 330). For example, learning component 230 may generate a reference dataset identifying sensor measurements and/or other information provided by user device 210 (e.g., information from a communications radio, audio data, image data, etc.) at the time that learning component 230 determines (e.g., in block 310) that the user is in the vehicle and/or that the user is driving the vehicle. Additionally, or alternatively, the reference dataset may identify sensor measurements and/or other information at a time prior to when learning component 230 determines that the user is in the vehicle (e.g., since learning component 230 determines that the user is in vehicle after the vehicle is in motion). For example, the reference dataset may identify the sensor measurements and/or other information prior to when the vehicle is in motion (e.g., when the user enters the vehicle, starts the vehicle, and performs some other action, such as fastening a seatbelt). In some implementations, learning component 230 may modify an existing reference dataset based on sensor data received at a time in which learning component 230 determines that the user is in the vehicle and/or driving the vehicle.

As an example, assume that in block 310, learning component 230 determines that the user is in the vehicle, but did not determine whether the user is driving the vehicle. Given this assumption, learning component 230 may generate a reference dataset identifying sensor measurements and/or other information indicating that the user has entered the vehicle. As another example, assume that in block 320, learning component 230 determines that the user is in the vehicle and is driving the vehicle (e.g., if vehicle systems component 250 indicates no passengers in the vehicle). Given this assumption, learning component 230 may generate a reference dataset identifying sensor measurements and/or other information indicating that the user has entered the vehicle and is driving the vehicle.

In some implementations, the reference dataset may identify particular accelerometer measurements around a time when learning component 230 determines that the user is in the vehicle. For example, the accelerometer measurements may indicate motions of walking towards the vehicle, entering the vehicle, opening the door of the vehicle, closing the door of the vehicle, etc. Similarly, the reference dataset may identify particular measurements from a gyroscope of user device 210 around the time when learning component 230 determines that the user is in the vehicle. For example, the gyroscope measurements may indicate motions of walking towards the vehicle, entering the vehicle, opening the door of the vehicle, closing the door of the vehicle, etc. Additionally, or alternatively, the gyroscope measurements may indicate an orientation of user device 210 after the user has entered the vehicle. For example, the gyroscope measurements may identify that the user device is in an "upright" orientation (e.g., an orientation in which a bottom or top surface of user device 210 is substantially parallel with the ground) or "flat" orientation (e.g., an orientation in which a back or front surface of user device 210 is substantially parallel with the ground). The gyroscope measurements may identify that the user device is in the "upright" or "flat" orientation (or in some other orientation) after the user has entered the vehicle (e.g., when a user places user device 210 in a cup holder or storage compartment after entering the vehicle).

In some implementations, the reference dataset may further identify particular measurements from a magnetometer around the time when learning component 230 determines that the user is in the vehicle. For example, magnetometer measurements may indicate that the engine of the vehicle has been started. In some implementations, the reference dataset may also identify the MAC address of a particular Bluetooth device connected to user device 210 at the time that learning component 230 determines that the user in the vehicle. For example, the reference dataset may identify the MAC address of radio or communications device associated with the vehicle.

In some implementations, the reference dataset may identify pressure measurements from a barometer of user device 210 around the time when learning component 230 determines that the user is in the vehicle. For example, the reference dataset may identify a change in pressure when the vehicle is in motion, thereby indicating that user is in the vehicle. In some implementations, the reference dataset may identify audio data around the time when learning component 230 determines that the user is in the vehicle. For example, the reference dataset may identify audio data indicating that the user is in the vehicle (e.g., audio of a vehicle door opening and closing, etc.). In some implementations, the reference dataset may identify image data (e.g., from a camera device of user device 210) around the time when learning component 230 determines that the user is in the vehicle. For example, the reference dataset may identify image data indicating that the user is in the vehicle (e.g., images of an interior of a vehicle, images of a driver-side of the vehicle, images of a passenger side of the vehicle, etc.). Additionally, or alternatively, the reference dataset may identify other data or other condition present at or around the time that learning component 230 determines that the user in the vehicle.

Process 300 may also include storing and/or outputting the reference dataset (block 340). For example, learning component 230 may output the reference dataset to determination component 220. Based on receiving the reference dataset, determination component 220 may determine whether the user is in the vehicle and/or driving the vehicle even when location identification hardware and/or location identification software processes are not in operation on user device 210. Additionally, or alternatively, learning component 230 may store the reference dataset for later retrieval by determination component 220, another device, and/or by an administrator.

As described in greater detail below, determination component 220 may determine the user is in the vehicle and/or driving the vehicle based on comparing sensor data from user device 210 with a reference dataset received from learning component 230 and/or with a preloaded reference dataset. Additionally, or alternatively, determination component 220 may determine that the user is in the vehicle and/or driving the vehicle when values of particular measurements of the sensor data satisfy particular thresholds. In some implementations, learning component 230 may update the reference dataset when determining that the user is in the vehicle (e.g., when location hardware and/or location software processes are in operation).

Figure 4:
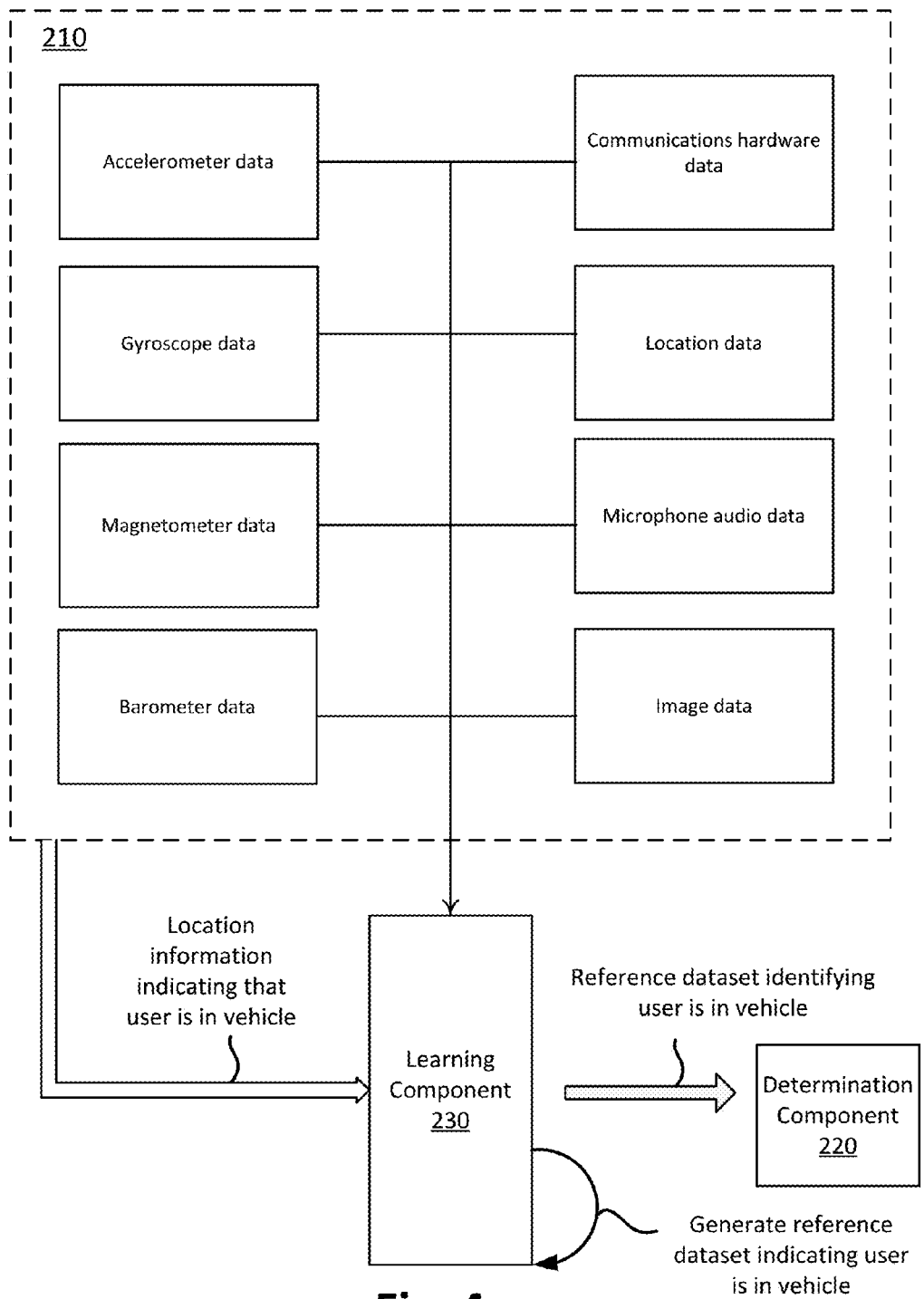
FIG. 4 illustrates an example implementation for generating a reference dataset indicating that a user is in a vehicle.

FIG. 4 illustrates an example implementation for generating a reference dataset indicating that a user is in a vehicle. As shown in FIG. 4, learning component 230 may receive location information indicating that the user of user device 210 is in a vehicle (e.g., based on location information of user device 210). For example, learning component 230 may receive the location information when location identification hardware and/or location identification software processes are in operation on user device 210. In some implementations, the location information may indicate that user is in the vehicle when the location information identifies that user device 210 is traveling at a speed exceeding a threshold (e.g., a speed indicative of travel within a vehicle). Additionally, or alternatively, the location information may indicate that the user in the vehicle when the location information identifies a location corresponding to a known location of the vehicle.

As further shown in FIG. 4, learning component 230 may receive data from sensor devices and/or other hardware associated with user device 210. For example, learning component 230 may receive accelerometer data, gyroscope data, magnetometer data, barometer data, communications hardware data (e.g., data regarding nearby WiFi networks, Bluetooth devices, etc.), location data, microphone audio data, image data, and/or other data. Learning component 230 may generate a reference dataset indicating that the user is in the vehicle, and output the reference dataset to determination component 220. For example, learning component 230 may generate a reference dataset indicating that particular accelerometer data, gyroscope data, magnetometer data, barometer data, communications hardware data, location data, microphone audio data, image data, and/or other data may indicate that the user in the vehicle. As described in greater detail below, determination component 220 may determine the user is in the vehicle and/or driving the vehicle based on comparing sensor data from user device 210 with a reference dataset received from learning component 230 and/or with a preloaded reference dataset.

In some implementations, learning component 230 may receive other data from user device 210 not shown in FIG. 4. For example, learning component 230 may receive biometrics data and/or other data from some other device associated with user device 210.

Figure 5:
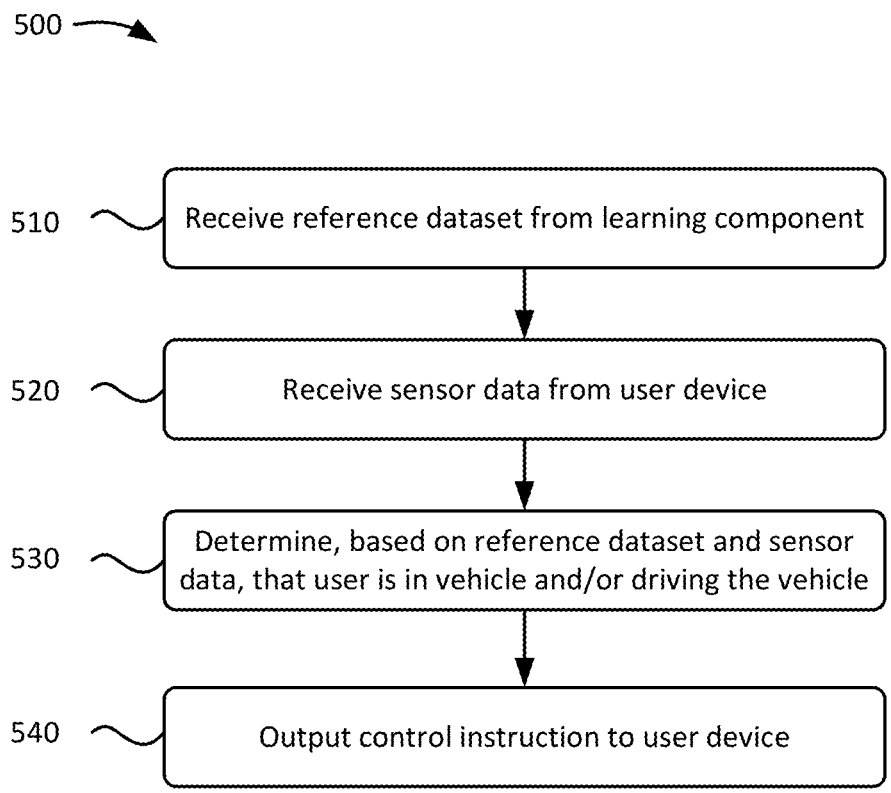
FIG. 5 illustrates a flowchart of an example process for determining that a user is in a vehicle and/or driving the vehicle when location identification hardware and/or processes are not in operation.

FIG. 5 illustrates a flowchart of an example process 500 for determining that a user is in a vehicle and/or driving the vehicle without using location information, such as when location identification hardware and/or processes are not in operation. In some implementations, process 500 may be performed by determination component 220. In some implementations, some or all of blocks of process 500 may be performed by one or more other devices.

As shown in FIG. 5, process 500 may include receiving a reference dataset from a learning component (block 510). For example, determination component 220 may receive the reference dataset from the learning component when determination component 220 generates the reference dataset (or updates an existing reference dataset), as described above with respect to FIG. 3.

Process 500 may also include receiving sensor data from user device 210 (block 520). For example, determination component 220 may receive sensor data and/or other information from user device 210. In some implementations, determination component 220 may receive accelerometer data, gyroscope data, magnetometer data, barometer data, communications hardware data (e.g., data regarding nearby WiFi networks, Bluetooth devices, Received Signal Strength Indication (RSSI) values of signals emitted by nearby devices associated with a vehicle, etc.), location data, microphone audio data, image data, and/or other data from user device 210.

Process 500 may further include determining, based on the reference dataset and the sensor data, that the user is in the vehicle and/or driving the vehicle (process 530). For example, determination component 220 may determine that the user is in the vehicle and/or driving the vehicle by comparing the sensor data, received from user device 210, with a reference dataset received from learning component 230 and/or with a reference dataset preloaded on determination component 220. Additionally, or alternatively, determination component 220 may determine that the user is in the vehicle and/or driving the vehicle when values of sensor data measurements satisfy particular thresholds.

In some implementations, determination component 220 may determine that that the user is in the vehicle when the sensor data, received from user device 210, matches, to within a particular degree of deviation, a reference dataset identifying values and/or measurements indicating that the user is in the vehicle. For example, assume that the reference dataset indicates that particular accelerometer measurements, gyroscope measurements, and magnetometer measurements indicate that the user in a vehicle. Further, assume that determination component 220 receives, from user device 210, accelerometer measurements, gyroscope measurements, and magnetometer measurements within a particular threshold degree of deviation from the accelerometer measurements, gyroscope measurements, and magnetometer measurements in the reference dataset. Given these assumptions, determination component 220 may determine that the user of user device 210 is in the vehicle. As another example determination component 220 may determine that the user of user device 210 is in the vehicle and/or driving the vehicle when values of sensor data, received from user device 210, are within a threshold number of standard deviations from values of measurements associated with the reference dataset. Additionally, or alternatively, other comparisons, other than standard deviation, may be used to determine a measure of closeness of the sensor data to the reference data set.

In some implementations, determination component 220 may determine that the user is in the vehicle and/or driving the vehicle based on a variety of factors and/or a variety of individual determinations. For example, determination component 220 may determine that the user has entered a vehicle based on accelerometer data and/or gyroscope data (e.g., by comparing sensor data from user device 210 with a reference dataset indicating that the user has entered the vehicle). Additionally, or alternatively, determination component 220 may determine that the user is in the vehicle based on magnetometer data indicating that the user is in the vehicle (e.g., by comparing magnetometer data from user device 210 with magnetometer data of a reference dataset indicating that the user is in the vehicle when magnetic field measurements substantially change).

Additionally, or alternatively, determination component 220 may determine whether the user is sitting in a front seat or rear seat of the vehicle based on magnetometer data indicating that the engine of the vehicle has been started. For example, determination component 220 may compare magnetometer measurement values, received from user device 210, with a reference dataset identifying magnetometer measurement values indicating that the user is in a front seat, and measurement values indicating the user is in a rear seat (e.g., the magnetometer measurement values may be substantially lower when the user is in a seat closer to the engine). Additionally, or alternatively, determination component 220 may determine whether the user is sitting in a driver side seat or a passenger side seat based on gyroscope data indicating a direction that the user turned when fastening a seatbelt. Additionally, or alternatively, determination component 220 may determine that the user is the driver of the vehicle based on information from vehicle systems component 250 indicating that no other passengers are in the vehicle.

Additionally, or alternatively, determination component 220 may determine that the user is in the vehicle based on gyroscope data indicating an orientation of user device 210. For example, a reference dataset may identify gyroscope measurements indicative of user device 210 being placed in a particular orientation when user device 210 is placed in a vehicle (e.g., when a user places user device 210 in a cup holder or storage compartment when the user enters the vehicle). Additionally, or alternatively, determination component 220 may determine that the user is in the vehicle based on a MAC address of a Bluetooth device connected to user device 210 (e.g., a Bluetooth device associated with the vehicle, as identified in the reference dataset). Additionally, or alternatively, determination component 220 may determine that the user is in the vehicle based on a location of user device 210 (e.g., as determined by a cellular network and/or WiFi network). Additionally, or alternatively, determination component 220 may determine that the user in the vehicle based on exiting the range of a WiFi network close to a location of the vehicle.

Additionally, or alternatively, determination component 220 may determine that user device 210 is in the vehicle based on comparing received audio data with audio data in a reference dataset indicating that the user in the vehicle. Additionally, or alternatively, determination component 220 may determine that the user in the vehicle based on pressure sensor measurements (e.g., by comparing received pressure sensor measurements with pressure sensor measurements in a reference dataset). Additionally, or alternatively, determination component 220 may determine that the user is in the vehicle and/or driving based on comparing image data, received from user device 210, with image data in a reference dataset (e.g., when the image data shows that the user is in a driver seat or passenger seat of a vehicle). Additionally, or alternatively, determination component 220 may determine that the user is in the vehicle and/or driving the vehicle based on some other data and/or other technique.

Process 500 may also include outputting a control instruction to the user device (block 540). For example, determination component 220 may output a control instruction to user device 210 based on determining that the user of user device 210 is in the vehicle and/or driving the vehicle. In some implementations, the control instruction may direct user device 210 to power on location identification hardware and/or to execute location identification software processes. In some implementations (e.g., when determination component 220 determines that the user is driving the vehicle), determination component 220 may output a control instruction to direct user device 210 to lock access to particular functions of user device 210. For example, user device 210 may lock functions relating to sending and/or receiving messages, sending and/or receiving telephone calls (except from particular individuals, such as family members of the user), browsing through applications of user device 210, and/or performing some other task using user device 210.

In some implementations, determination component 220 may later determine that a user has exited the vehicle (e.g., based on sensor data and/or location information), and may direct user device 210 to discontinue using location identification hardware and/or discontinue executing location identification hardware. As a result, location identification techniques may be used only when needed, thereby reducing power consumption on user device 210. Further, particular functions may be locked on user device 210, thereby improving driver safety. In some implementations, particular functions on user device 210 may be unlocked when the user has exited the vehicle. Additionally, or alternatively, particular functions on user device 210 may be unlocked when a passenger of the vehicle operates user device 210. For example, user device 210 may identify that a user other than the primary user is operating user device 210 based on biometrics data (e.g., fingerprint data, retina scan data, voiceprint data, facial recognition data, etc.).

In some implementations, user device 210 may track location information after receiving the control instruction as part of a vehicle usage analysis. User device 210 may output vehicle usage information (e.g., information identifying details of a trip). In some implementations, the vehicle usage information may be used for insurance rating purposes, fuel consumption analysis, driver habits analysis, and/or for another type of analysis. In some implementations, user device 210 may receive the control instruction after the vehicle has been in motion for some time (e.g., in a situation where determination component 220 did not detect that the user was in a vehicle until after the vehicle was in motion). In this situation, user device 210 may determine an origin of the vehicle (e.g., a home or office location associated with the user), and add the distance between the determined origin and a present location of the vehicle when outputting vehicle usage information.

Figure 6:
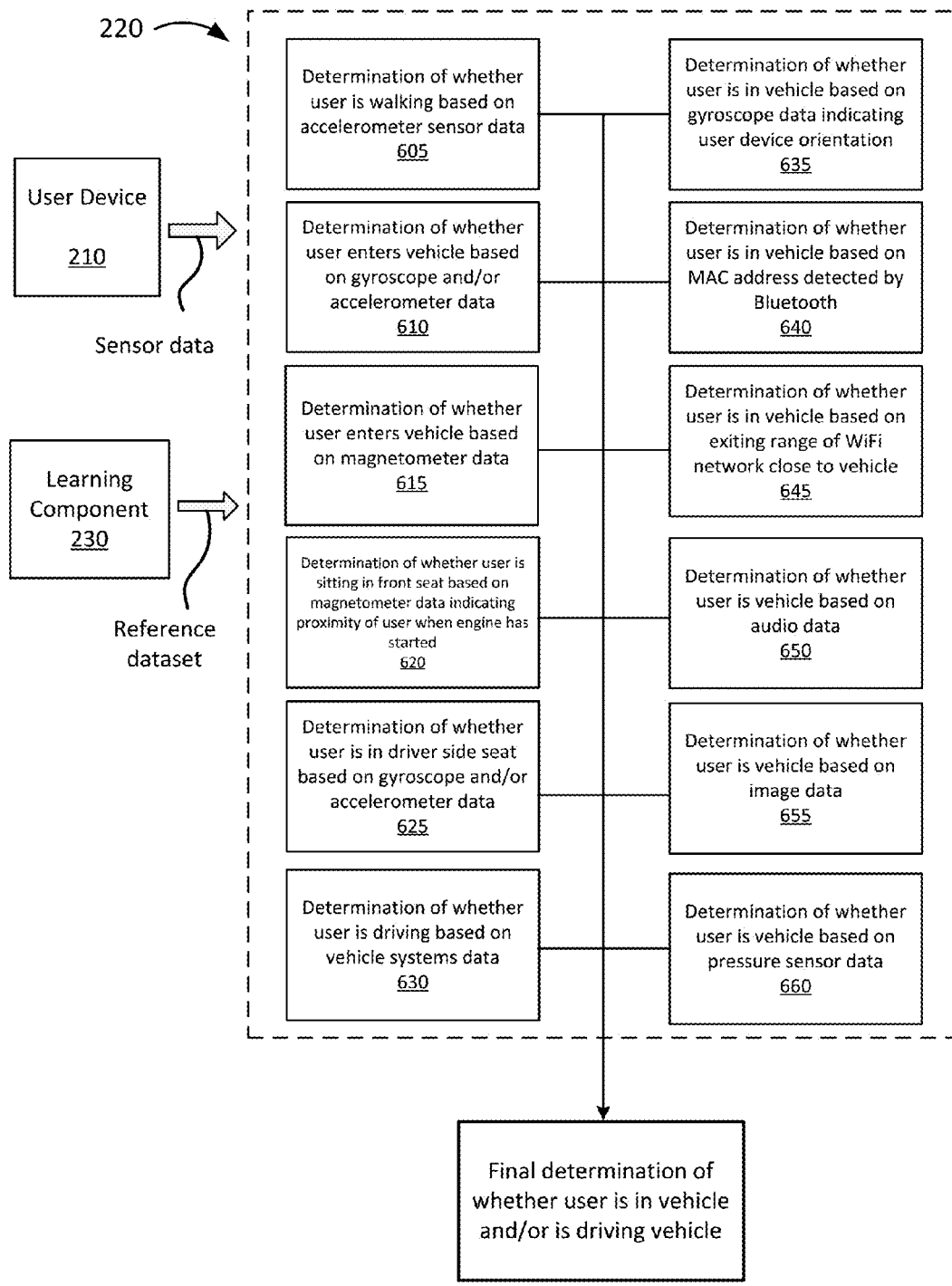
FIG. 6 illustrates an example implementation for determining whether a user is in a vehicle and/or driving the vehicle.

FIG. 6 illustrates an example implementation for determining whether a user is in a vehicle and/or driving the vehicle. As shown in FIG. 6, determination component 220 may receive sensor data from user device 210 and a reference dataset from learning component 230. Based on the sensor data and the reference dataset received from learning component 230 (and/or a reference dataset preloaded in determination component 220), determination component 220 may determine whether a user of user device 210 is in a vehicle and/or driving the vehicle. For example, as shown in FIG. 6, determination component 220 may determine whether the user is walking based on accelerometer sensor data received from user device 210 (block 605), whether the user enters the vehicle based on gyroscope and/or accelerometer data received from user device 210 (block 610), and/or whether the user enters the vehicle based on magnetometer data received from user device 210 (block 615).

Additionally, or alternatively, determination component 220 may further determine whether the user is sitting in a front seat based on magnetometer data, received from user device 210, indicating the proximity of the user to an engine of the vehicle upon the engine being started (block 620). For example, the magnetometer measurement values may substantially drop when the engine is started. The amount that the magnetometer measurement values drop may indicate the proximity of the user to the engine, and may further indicate whether the user is in a front or rear seat of the vehicle. As further shown in FIG. 6, determination component 220 may determine whether the user in a driver side seat based on gyroscope and/or accelerometer data, received from user device 210, indicating that the user turned a particular direction to fasten a seat belt (block 625). Additionally, or alternatively, determination component 220 may determine whether the user is driving based on information from vehicle systems component 250, such as information indicating whether other passengers are present in the vehicle (block 630). Block 630 may be based on vehicle system data, such as Bluetooth syncing information, to determine if the user is in a vehicle. Outputs of block 630 may include: time of entrance and the vehicle, vehicle system being used, vehicle diagnostic information such as seat weight sensors, or other vehicle sensors that may allow for the determination of the number and location of vehicle occupants.

Additionally, or alternatively, determination component 220 may determine whether the user is in the vehicle based on an orientation of user device 210 as identified by gyroscope data received from user device 210 (block 635). Additionally, or alternatively, determination component 220 may determine whether the user in the vehicle based on a MAC address of a Bluetooth device connected to user device 210 (block 640). Additionally, or alternatively, determination component 220 may determine whether the user is in the vehicle based on information, received from user device 210, indicating that user device 210 exits the range of a WiFi network that is close to a known location of the vehicle (block 645). Additionally, or alternatively, determination component 220 may determine whether the user in the vehicle based on audio data, received form user device 210, indicating whether the user in the vehicle. Additionally, or alternatively, determination component 220 may determine whether the user is in the vehicle based on image data received from user device 210 (block 655). Additionally, or alternatively, determination component 220 may determine whether the user is in the vehicle based on pressure sensor data received from user device 210 (block 660).

Based on the above information, determination component 220 may make a final determination of whether the user is in the vehicle and/or driving the vehicle. For example, each determination described above with respect to blocks 605-660 may be associated with a value. Determination component 220 may generate a cumulative score by combining the values (e.g., adding, subtracting, multiplying, averaging the values, weighting the values differently, etc.). The cumulative score may identify the likelihood that the user is in the vehicle and driving the vehicle.

Determination component 220 may simultaneously perform processes corresponding to blocks 605-660. Additionally, or alternatively, determination component 220 may perform certain processes of blocks 605-660 based on particular inputs and outputs of dependent and/or non-dependent blocks. Outputs of blocks 605-660 may be used inputs to learning component 230.

Determination component 220 may determine user vehicle ingress/egress based on sensor data received from user device 210. In some implementations, features from raw data may be extracted or computed before a learning algorithm is used to make these determinations. Features allow for compressed representations of data. For example, 3-axis accelerometer data sampled at 50 Hz for a duration of 5 seconds would create 750 individual samples. When analyzing the strength of large acceleration events, the maximum of the acceleration magnitude may be calculated based on formula 1 below:

$$\max\sqrt{(a_x)^2 + (a_y)^2 + (a_z)^2} \quad \text{(Formula 1)}$$

In Formula 1, $a_x$, $a_y$, and $a_z$ are the vectors of raw acceleration values from a 3-axis accelerometer. The maximum magnitude over the time window may then be used as an input to a learning model, rather than the 750 individual samples (or other number of samples). As described below, features may be extracted based on raw sensor data.

Determination component 220 may simultaneously perform processes corresponding to blocks 605-660. Additionally, or alternatively, determination component 220 may perform certain processes of blocks 605-660 based on particular inputs and outputs of dependent and/or non-dependent blocks. Outputs of blocks 605-660 may be used inputs to learning component 230.

FIG. 7 illustrates a flowchart of an example process 700 for determining whether a user is walking to a vehicle based on sensor data. In some implementations, process 700 may be performed by determination component 220. In some implementations, some or all of blocks of process 700 may be performed by one or more other devices. Process 700 may correspond to operations of block 605 in FIG. 6.

Process 700 may be implemented using a pedometer algorithm, pattern recognition techniques, and/or using filters and threshold values to determine outputs. The pedometer method may output one or more of the following data values to be used by the learning method: Indication of walking during a specific time frame, number of steps within a specific time frame, time between steps, number of steps within a predefined time threshold, number of classified running steps within a predefined time, number of walking steps within a predefined time threshold, amount of time within a step collection phase with unknown events based on sensor measurements, deviation of the phones orientation while a step is classified to occur, value indicating that a number of sequential steps have stopped, the time that the steps have stopped.

As shown in FIG. 700, sensor data may be sampled (block 710), for example 3-axis accelerometer data. Data may then be processed by a predetermined pedometer technique (step 720). The processed data may be used to determine user steps (e.g., if a user is walking), and may also be used to determine other pedometer-related metrics (step 1030). Relevant metrics and indication that a user is walking my then be output to a learning component (block 740).

FIG. 8 illustrates a flowchart of an example process 800 for determining user vehicle ingress and/or egress using a classification technique. In some implementations, process 800 may be performed by determination component 220. In some implementations, some or all of blocks of process 800 may be performed by one or more other devices. Process 800 may correspond to operations of block 610 in FIG. 6.

In some implementations, outputs of process 800 may be implemented using pattern recognition, feature extraction from sensor measures (e.g. mathematical operations on a predetermined amount of sensor data: mean, min, max standard deviation, energy measure, number of samples spent below or above a threshold, integral, derivative, etc.) used for machine learning techniques to classify instances where a user is sitting within a vehicle based on a reference dataset of users sitting in vehicles. Some learning techniques on features extracted or raw sensor measures may include pattern recognition, artificial neural networks, logistic regression, classification trees, or ad-hoc approaches to determining that a user entered a vehicle.

Based on performing process 800, determination component 220 may output one or more of the following measures: a value indicating the relative intensity of an instance in which a user is sitting (e.g. based on perceived and annotated data of users sitting in vehicles while being observed), a value indicating the duration of the instance in which the user is sitting, information identifying a type of seating position (e.g. observed values that corresponds to how a user sits in a vehicle, such as a "plopped seating position", a "lazy seating position", a "relaxed seating position," etc.), value indicating the amount of force when a user is sitting in the vehicle (e.g. a magnitude of acceleration based on acceleration data), mathematical measures of the sitting occurrence (e.g. mathematical operations on a predetermined amount of sensor data: mean, min, max standard deviation, energy measure, number of samples spent below or above a threshold, integral, derivative, etc.), a binary value indicating during a time period that a siting occurrence was determined or a non-sitting occurrence was determined, the rotation present (e.g. a typical degree change value indicating during the classified occurrence of the sit may indicate during the sit how much user device 210 changed in orientation), magnetic field deviation (the amount that the magnetic field changed while when the user is sitting), etc.

As shown in FIG. 8, sensor data may be sampled (block 810), for example 3-axis accelerometer data, and/or 3-axis gyroscope data. Data may then be processed and features may be extracted (block 820) to determine if a user has entered a vehicle (block 830). Metrics and/or an indication that a user is sitting may then be output to learning component 230 (block 840).

Figure 9:
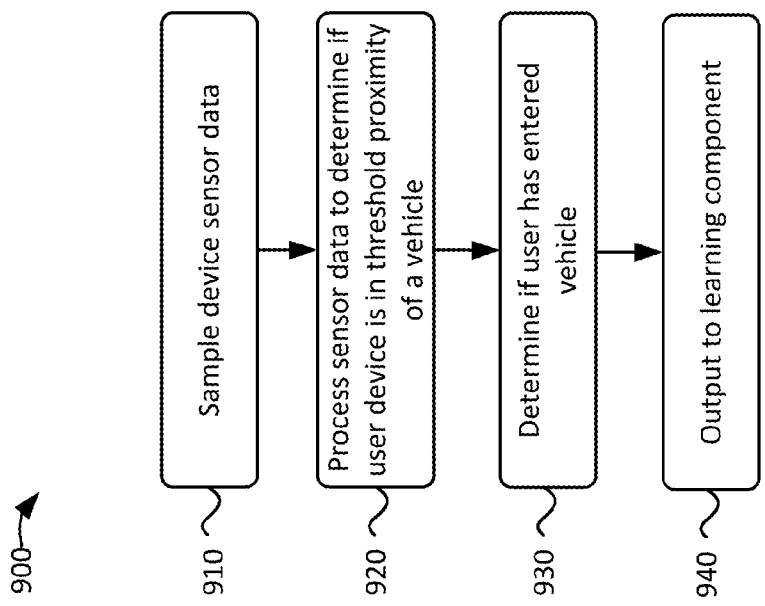
FIG. 9 illustrates a flowchart of an example process for determining user vehicle ingress and/or egress based on magnetometer data.

FIG. 9 illustrates a flowchart of an example process 900 for determining user vehicle ingress and/or egress based on magnetometer data. In some implementations, process 900 may be performed by determination component 220. In some implementations, some or all of blocks of process 900 may be performed by one or more other devices. Process 900 may correspond to operations of block 615 in FIG. 6. Process 900 may be used to determine a difference in magnetic field measurements before and after a user enters a vehicle.

Sensor data measurements (e.g., magnetometer data) may be direction agnostic, and may include magnitude measurements of all three axes of magnetometer data. In some implementations, measurements may be based on the orientation of user device 210 before and after images of vehicle via accelerometer, gyroscope, or other relevant sensors. Given the pre and post ingress orientation of user device 210, the measured magnetic field inside the vehicle may be projected back into the orientation of user device 210 outside the vehicle, in this way the changes in X, Y, and Z magnetic field may be monitored.

Determination component 220 may process magnetometer data using pattern recognition and/or by machine learned or predetermined feature extraction from raw sensor data (e.g. mathematical operations on a predefined amount of sensor data: mean, min, max standard deviation, energy measure, number of samples spent below or above a threshold, integral, derivative, etc.). Extracted features may then be used in machine learning techniques to train a computational model, which may be used to predict if a user has entered a vehicle based on magnetometer data. Preferred learning methods based on features extracted or raw sensor measures include but are not limited to pattern recognition, artificial neural networks, logistic regression, classification trees, or ad-hoc approaches to determining that a user entered a vehicle.

The processed data may then be output to a learning component (block 930). In some implementations, determination component 220 and/or learning component 230 may output one or more of the following: mathematical measures of the magnetometer data (e.g. mathematical operations on a predefined amount of sensor data: mean, min, max standard deviation, energy measure, number of samples spent below or above a threshold, integral, derivative, etc.), the change in magnetic field strength measured while entering the vehicle, indication that a user is in a vehicle.

As shown in FIG. 9, sensor data may be sampled (block 910), for example 3-axis magnetometer data. Data may then be processed and features may be extracted (block 920) to determine if a user has entered a vehicle (block 930). Metrics and an indication that a user is sitting may then be output to a learning component (block 940).

Figure 10:
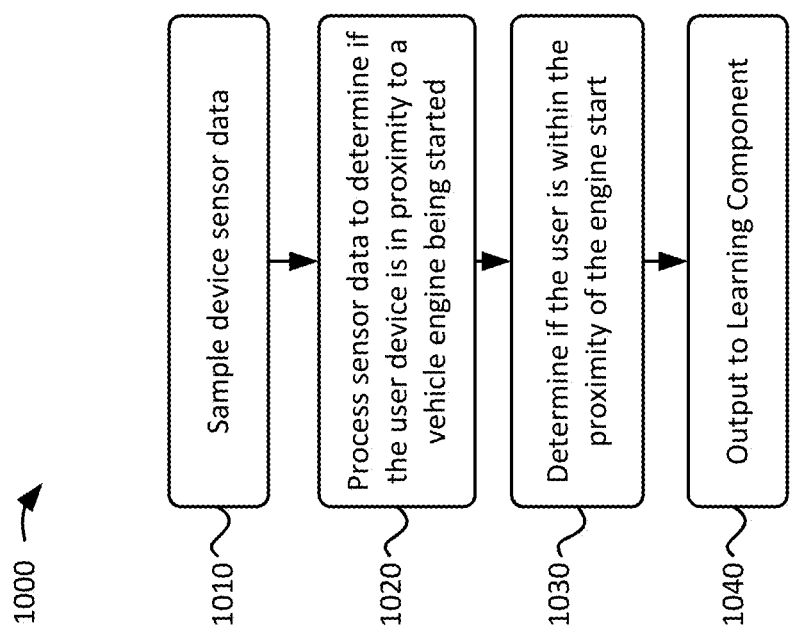
FIG. 10 illustrates a flowchart of an example process for determining a user's location in a vehicle based on magnetometer data.

FIG. 10 illustrates a flowchart of an example process 1000 for determining a user's location in a vehicle based on magnetometer data. In some implementations, process 1000 may be performed by determination component 220. In some implementations, some or all of blocks of process 1000 may be performed by one or more other devices. Process 1000 may correspond to operations of block 620 in FIG. 6

Figure 11:
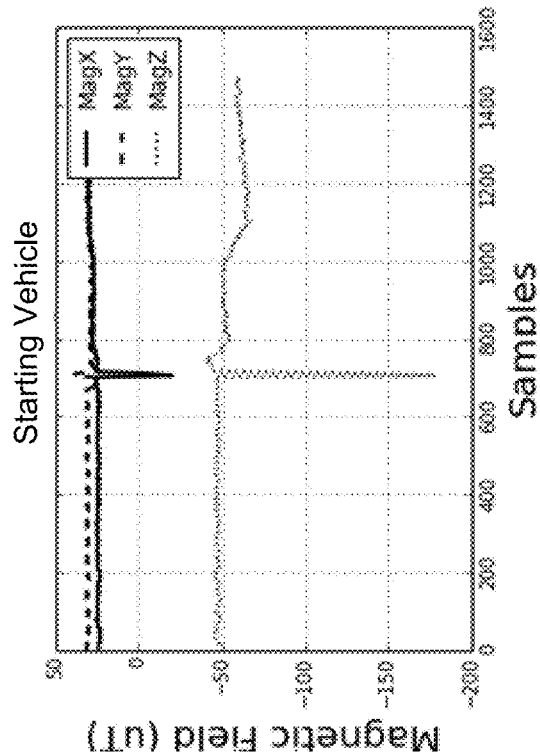
FIG. 11 illustrates a plot of the change in magnetic field deviations when starting a vehicle.

In some implementations, outputs of process 1000 may be based on magnetometer data to determine where a user is sitting within a vehicle, and to further determine other information regarding the vehicle. Starting and operating a motor vehicle may produce measurable magnetic field perturbations. Magnetic field perturbations created by vehicle components may vary significantly depending on where in the vehicle the measurement device is located. For example, FIG. 11 illustrates a plot of the change in magnetic field deviations when starting a vehicle. Relatively short and substantial spikes are the magnetic field and may be useful in determining if user device 210 is within a vehicle that is being started. Pattern recognition or feature extraction followed by learning methods may be used to train learning models to predict where a user is sitting within a vehicle.

Returning to FIG. 10, determination component 220 may output the following (e.g., based on performing process 1000): information identifying a probability that the vehicle being started is a user's vehicle, a time at which the vehicle starts, a value indicating the vehicle has started, mathematical measures of the classified vehicle start (e.g. mathematical operations on a predefined amount of sensor data: mean, min, max standard deviation, energy measure, number of samples spent below or above a threshold, integral, derivative, etc.).

As shown in FIG. 10, sensor data may be sampled (block 1010), for example 3-axis magnetometer data. Data may then be processed and features may be extracted (block 1020) to determine if a user has started a vehicle (block 1030). Metrics and an indication that a user is sitting may then be output to a learning component (block 1040).

FIG. 12 illustrates a flowchart of an example process 1200 for determining that the user has entered a vehicle, and which side of the vehicle the user has entered. In some implementations, process 1200 may be performed by determination component 220. In some implementations, some or all of blocks of process 1200 may be performed by one or more other devices. Process 1200 may correspond to operations of block 625 in FIG. 6

In some implementations, outputs of process 1200 may be based on gyroscope and/or accelerometer data to determine which side of the vehicle (driver or passenger) a user may have entered from. This information may be useful in determining if the user of a device as a driver or passenger. It may improve algorithm performance to estimate device orientation when the forces acting on the device are steady state (e.g., when the vehicle is at rest or constant velocity and only the force of gravity effect the device). The degree change of the device may be determined by collected reference data sets to estimate the degree change that occurs for the act of entering and the rotation that occurs when a user enters the vehicle. Sensors data and/or features extracted from gyroscope and/or accelerometer data and may be inputs into a learning algorithm of learning component 230. Examples of output values can include: rotation direction, side of the vehicle the user has entered through, measure of certainty that the rotation estimate is correct, angle measure of rotation, or time required for rotation.

As shown in FIG. 12, sensor data may be sampled (block 1210), for example 3-axis gyroscope and accelerometer data. Data may then be processed and relevant features may be extracted (block 1220) to determine if a user has entered a vehicle (block 1230). Metrics and an indication that a user is sitting my then be output to a learning component (block 1240).

FIG. 13 illustrates a flowchart of an example process 1300 for determining that the user has entered a vehicle, and an orientation of a user device when the user has entered the vehicle. In some implementations, process 1300 may be performed by determination component 220. In some implementations, some or all of blocks of process 1300 may be performed by one or more other devices. Process 1300 may correspond to operations of block 635 in FIG. 6

In some implementations, outputs of process 1300 may be based on gyroscope and/or accelerometer data to determine: if user device 210 orientation remains static (e.g., indicating that a user has not left a vehicle and/or that user device 210 is in an orientation in which user device 210 is in a preferred locations when a user is in the vehicle and/or driving (e.g. cup holder)). If user device 210 orientations match historical orientations when the user is driving, this evidence may be used as an input to learning component 230, and may increase the probability that the user is in a vehicle, and potentially the probability that the user is the driver. Algorithm performance may be improved when estimating user device 210 orientation when the forces acting on user device 210 are steady state (when the vehicle is at rest or constant velocity and only the force of gravity effect the device).

In some implementations, the degree change of the device may be determined by collected reference data sets that are observed and empirically determined to estimate the degree change that occurs for the act of entering and the natural rotation that occurs when a person enters the vehicle. Based on performing process 1300, determination component may output sensor data or features extracted from gyroscope and/ or accelerometer data. These outputs may be inputs into a learning algorithm of learning component 230. Examples of output values can include: rotation direction, measure of certainty that the rotation estimate is correct, angle measure of rotation, or time required for rotation, orientation of the device.

As shown in FIG. 13, sensor data may be sampled (block 1310), for example 3-axis gyroscope and accelerometer data. Data may then be processed and features may be extracted (block 1310) to determine if a user has entered a vehicle (block 1330). Metrics and indication that a user is sitting my then be output to a learning component (block 1340).

FIG. 14 illustrates a flowchart of an example process 1400 for determining that the user has entered a vehicle based on Bluetooth data. In some implementations, process 1400 may be performed by determination component 220. In some implementations, some or all of blocks of process 1400 may be performed by one or more other devices. Process 1400 may correspond to operations of block 640 in FIG. 6

In some implementations, outputs of process 1400 may be based on Bluetooth pairing data between vehicles and user devices 210. In some implementations, the pairing data may be used to determine that a user has entered a particular vehicle if Bluetooth pairing between user device 210 and a vehicle occurs. Based on performing process 1300, determination component 220 may output: information identifying a time that one or more MAC address are paired to user device 210, the individually identifiable MAC address that corresponds to a particular vehicle, the frequency of historical pairing to a particular MAC address, the frequency of historical pairing to a particular MAC address versus other MAC addresses, the amount time that the MAC address has been pair with user device 210, etc.

As shown in FIG. 14, Bluetooth sensor data may be sampled (block 1410). Data may then be processed and features may be extracted (block 1420) to determine if a user has entered or left a vehicle (block 1430). Metrics and an indication that a user is sitting may then be output to a learning component (block 1440).

FIG. 15 illustrates a flowchart of an example process 1500 for determining that the user has entered a vehicle based on wireless network information. In some implementations, process 1500 may be performed by determination component 220. In some implementations, some or all of blocks of process 1500 may be performed by one or more other devices. Process 1500 may correspond to operations of block 645 in FIG. 6

In some implementations, outputs of process 1500 may be based on wireless network information to determine if a user leaves a particular area. For example, if user device 210 is connected to a particular wireless network (e.g., at a user's home), and if user device 210 later leaves the proximity of this wireless network, determination component 220 may determine that the user has left the home location (e.g., indicating that user may now be in a vehicle). Based on performing process 1400, determination component may output: information identifying the amount of time spent within a wireless network range, the amount of time a specific wireless network has been out of range, the signal strength of a wireless network currently in range, the number of wireless networks currently available, the unique identifiers of the wireless networks available, the unique identifier of unavailable wireless network that is being used by a user device. Proximity to relevant wireless networks may also be used to indicate if a user is arriving at or leaving particular locations, such as home or office locations.

As shown in FIG. 15, wireless network sensor data may be sampled (block 1510). Data may then be processed and relevant features may be extracted (block 1520) to determine if a user has entered or left a vehicle (block 1530), or if a vehicle is leaving or entering a specific area. Metrics and indication that a user is sitting my then be output to a learning component (block 1540).

Figure 16:
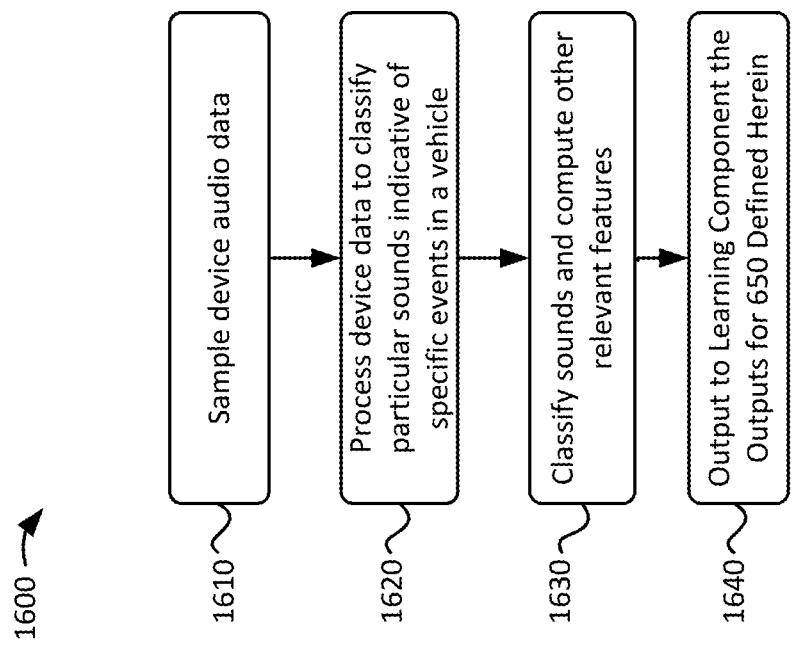
FIG. 16 illustrates a flowchart of an example process for determining that the user has entered a vehicle based on audio data.

FIG. 16 illustrates a flowchart of an example process 1600 for determining that the user has entered a vehicle based on audio data. In some implementations, process 1600 may be performed by determination component 220. In some implementations, some or all of blocks of process 1600 may be performed by one or more other devices. Process 1600 may correspond to operations of block 650 in FIG. 6

In some implementations, outputs of process 1600 may be based on audio data to make determinations involving user activity. Natural image processing or pattern recognition in the time or frequency domain may be used to classify audio signals. Example signals that may be classified may include: noises relating to vehicle engine, vehicle door closing, vehicle door opening, radio, and/or ignition related alert tones. Based on performing process 1600, determination component 1600 may output information regarding classifications of recorded sounds, and/or features such as harmonic content or amplitude of audio signals.

As shown in FIG. 16, sensor data (e.g., audio data) may be sampled (block 1610), for example audio sample form one or more device microphones. Data may then be processed and relevant features may be extracted (block 1620) to determine if a user has entered or left a vehicle (block 1630). Metrics and an indication that a user is sitting in a vehicle may then be output to a learning component (block 1640).

Outputs of block 660 in FIG. 6 may be based on pressure data to determine if the user device is in a vehicle. For example, in non-flat areas, pressure measured by user device 210 pressure sensors such as barometers, may fluctuate with the altitude of the vehicle above sea level in a predictable way. The presence of characteristic fluctuations may be used as an output of block 660 indicative that user device 210 is in a vehicle. Further, fluctuations in pressure may be correlated to digital elevation models (DEMs), to gather location information without relying on GPS sensors of user device 210 (e.g. hardware that may consumer a substantial amount of power).

An example learning technique, described below, may be based on one or more of the of the features mentioned above. While learning techniques may be used to learn features from raw data, in learning techniques may additionally, or alternatively, be based on predetermined features, as described in the example below.

Table 1 shows example features and values for three example vehicle entry events. Subsets (referred to as "time subsets") of data associated with sub-events relating to vehicle entry (e.g., walking to a vehicle, entering a vehicle, starting the engine of the vehicle, etc.) may be determined by intervals (e.g. every minute, or some other interval), and/or determined by events such acceleration and gyroscope patterns representative of entering a vehicle.

TABLE 1

Example Vehicle Ingress Data

| Feature | Variable Name | Vehicle Entry 1 | Vehicle Entry 2 | Vehicle Entry 3 |
|---|---|---|---|---|
| Number of steps in time subset one | $x_1$ | 13 | 29 | 100 |
| Probability that user stopped walking in subset one | $x_2$ | 0.9 | 0.7 | 0.2 |
| Gyroscope rotation degrees in time subset two (degrees) | $x_3$ | 50 | −20 | 30 |
| Max acceleration value in time subset two (g's) | $x_4$ | 2.1 | 2.5 | 1.5 |
| Sum of 10 samples around acceleration maximum in time subset two (g's) | $x_5$ | 15.5 | 13.2 | 11.2 |
| Change in magnitude of magnetic field measured by magnetometer in time subset two (uT) | $x_6$ | −100 | −200 | 150 |
| Harmonicity of sounds measured by the microphone in time subset two | $x_7$ | 0.2 | 0.8 | 0.5 |

The data shown in table 1 may be used in various types of learning models. If a supervised model is used, additional data collected when users are not entering vehicles may be used as negative examples. Data examples corresponding to when a user enters a vehicle may be stored and labeled with an output value of "1" to indicate that positive examples, while data not corresponding to vehicle ingress may be labeled with a "0". The learning technique may then be posed as a classification technique—given input data, the model may predict whether the data corresponds to class 0 (not ingress), or class 1 (ingress). Various computational models may be used, such as support vector machines, decision trees, logistic regression, Gaussian process models, and artificial neural networks (ANNs). An example using an ANN application is described below.

Before a learning model is trained, input data may be normalized. For example, input data may be normalized by subtracting the mean and dividing by the standard deviation:

$$x_{1,norm} = \frac{x_1 - \mu_{x_1}}{\sigma_{x_1}} \quad \text{(Formula 2)}$$

where $\mu_{x_1}$ represents the mean of all $x_1$ and $\sigma_{x_1}$ represents the standard deviation of all $x_1$. Normalized input values may then be stored in the vector $X=\{x_1,x_2,x_3,x_4,x_5,x_6\}$ and used as the inputs to a neural network, for example the simplified neural network shown in FIG. 17 (note that only 3 inputs, rather than 7, have been shown for simplicity).

Figure 17:
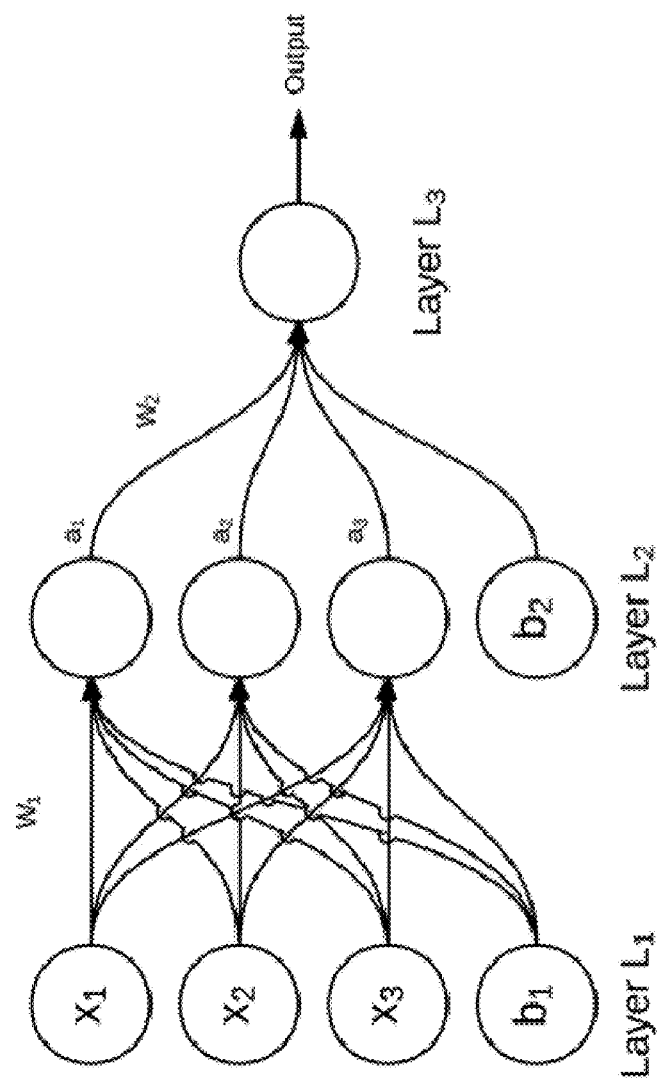
FIG. 17 illustrates an example neural network.

The neural network shown in FIG. 17 may include input layer $L_1$, hidden layer $L_2$, and output layer $L_3$. Values for layers $L_1$ and $L_3$ may be based on the training set. Output values are set to correct label (0 or 1) for each input. The structure of neural network 1700 is shown as an example, where implementations may consist of more hidden layers, and more inputs. Each neuron in layers $L_2$ and $L_3$ sums all inputs to the neuron and may apply the result to this input of its activation function. For example, a sigmoid function may be used as an activation function, resulting in an output from a given neuron as shown in formula 3.

$$\text{neuron output} = \frac{1}{1 + \exp(-W_i^j X^T + b_i)} \quad \text{(Formula 3)}$$

In formula 3, W represents the weights (to be learned) applied to each input value. Neural network 100 consists of 2 weight matrices to be learned in the training process, $W_1$(3×3), and $W_1$(1×3), and two bias values $b_1$ and $b_2$, which may also be learned in the training process. $W_i^j$ corresponds to layer i and the row of W corresponding to neuron j. In this way, inputs may be propagated forward through the network into a single output, or prediction.

Once the structure of a neural network has been established, a number of techniques may be used for training, and may be based on the backpropogation of errors through the network. An example technique may be based on minimizing a cost function, and/or may be based another optimization technique. For example, neural network 1700 may make be based on a cost function such as formula 4 for a single training example.

$$C(W, b; X, y) = \frac{1}{2} \|\text{output} - y\|^2 \quad \text{(Formula 4)}$$

In formula 4, C(W,b;X,y) represents the cost of a specific set of weights for a single training example, cost may be understood as proportional to the difference between the correct output, y, and the modeled output. The overall cost may be minimized for a set of training examples, for example the examples shown in table 1, is shown in formula 5.

$$C(W, b) = \left[\frac{1}{m}\sum_{i=1}^{m}\left(\frac{1}{2}\|\text{output}_i - y_i\|^2\right)\right] + \frac{\lambda}{2}\sum_{j=1}^{2}\sum_{i=1}^{N}\sum_{k=1}^{M}\left(W_j^{i,k}\right)^2 \quad \text{(Formula 5)}$$

In formula 5, there are m training examples, and each weight matrix, $W_j$, consist of N rows and M columns, and $W_j^{i,k}$ represents a single entry in matrix $W_j$. The first term in equation 5 is the sum of square errors, and the second term, often referred to as a regularization term, helps avoid overfitting. The parameter $\lambda$ may be tuned during the overall process and represents a trade-off between minimizing error and preventing overfitting. Finally, neural network 1700 may be trained by minimizing the cost function, C. This may be accomplished by a number of optimization techniques, such as stochastic or batch gradient descent, and/or another optimization technique.

Figure 18:
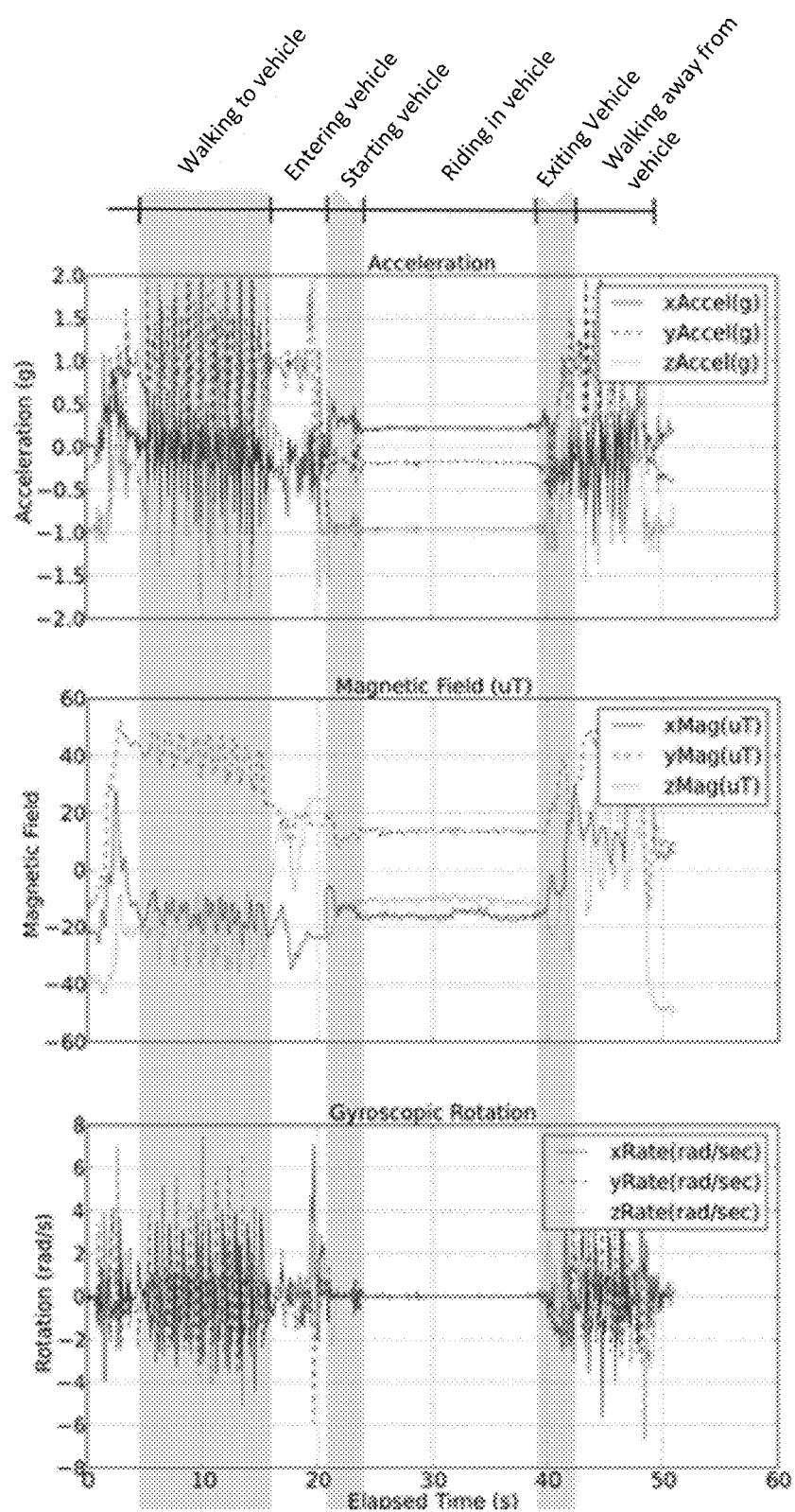
FIG. 18 illustrates graphs of example accelerometer measurements, magnetometer measurements, and gyroscope measurements.

FIG. 18 illustrates graphs of example accelerometer measurements, magnetometer measurements, and gyroscope measurements. The graphs shown in FIG. 18 may represent data in a reference dataset (e.g., a preloaded reference dataset based on experimental data and/or a reference dataset generated by learning component 230). As shown in FIG. 18, the graphs may be segmented by user actions (e.g., the actions of the user walking to a vehicle, entering the vehicle, starting the vehicle, riding in the vehicle, exiting the vehicle, and walking away from the vehicle). In some implementations, determination component 220 may determine the actions of the user when the sensor data, received by determination component 220 from user device 210, match the data in a reference dataset to within a particular degree. For example, determination component 220 may determine that the user has entered the vehicle and exited the vehicle when sensor data, received form user device 210, match the data in a reference dataset to within a particular degree.

Figure 19:
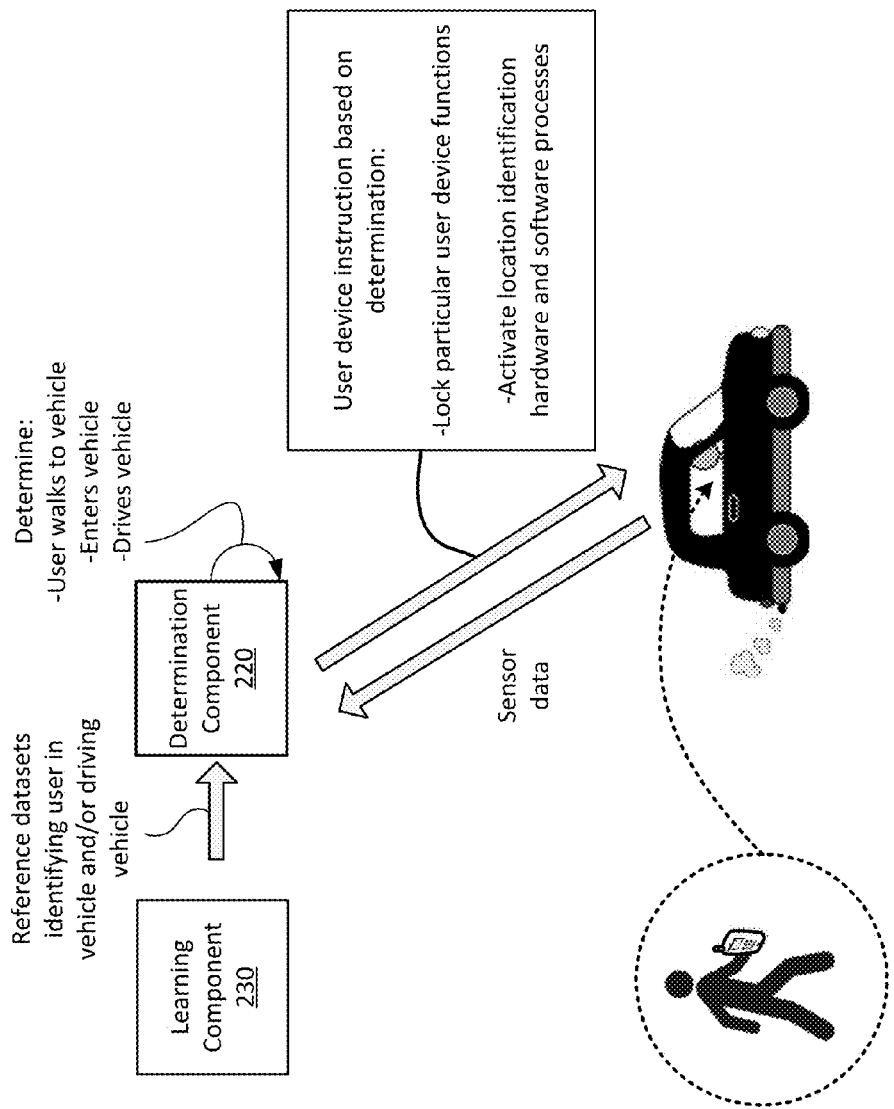
FIG. 19 illustrates an example implementation for outputting control instructions to a user device based on determining that a user of the user device is driving a vehicle.

FIG. 19 illustrates an example implementation for outputting control instructions to a user device based on determining that a user of the user device is driving a vehicle. As shown in FIG. 19, determination component 220 may receive a reference dataset from learning component 230. Determination component 220 may further receive sensor data from user device 210. For example, determination component 220 may receive the sensor data from user device 210 as a user of user device 210 is walking towards a known location of a vehicle, when the user enters the vehicle, and when the user drives the vehicle. Based on the sensor data, received from user device 210, the reference dataset received from learning component 230, a reference dataset preloaded on determination component 220, and/or other information, determination component 220 may determine that the user is walking to the vehicle, the user has entered the vehicle, and the user is driving the vehicle. Based on determining that the user has entered the vehicle and is driving the vehicle, determination component 220 may output a control instruction to cause user device 210 lock particular function on user device 210. Further, the control instruction may direct user device 210 to activate location identification hardware and/or software processes (e.g., so that user device 210 can track vehicle usage information). In some implementations, determination component 220 may determine when a user exits the vehicle, and may direct user device 210 to power off location identification hardware and/or discontinue location identification software processes, thereby reducing power consumption on user device 210 while permitting user device 210 to track vehicle usage information when the user is in the vehicle and/or driving the vehicle.

Figure 20:
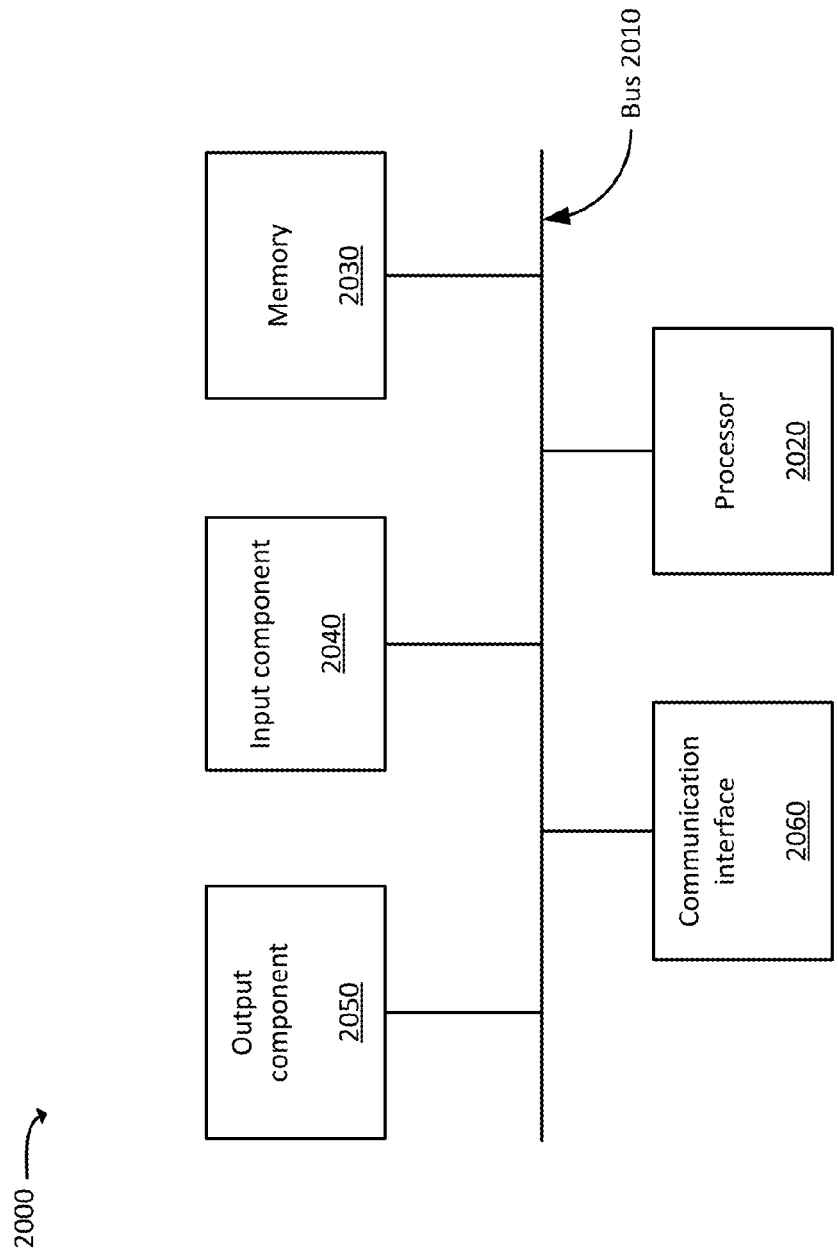
FIG. 20 illustrates example components of one or more devices, according to one or more implementations described herein.

FIG. 20 is a diagram of example components of device 2000. One or more of the devices described above (e.g., with respect to FIGS. 1, 2, 4, 6, and 19) may include one or more devices 2000. Device 2000 may include bus 2010, processor 2020, memory 2030, input component 2040, output component 2050, and communication interface 2060. In another implementation, device 2000 may include additional, fewer, different, or differently arranged components.

Bus 2010 may include one or more communication paths that permit communication among the components of device 2000. Processor 2020 may include a processor, microprocessor, or processing logic that may interpret and execute instructions. Memory 2030 may include any type of dynamic storage device that may store information and instructions for execution by processor 2020, and/or any type of non-volatile storage device that may store information for use by processor 2020.

Input component 2040 may include a mechanism that permits an operator to input information to device 2000, such as a keyboard, a keypad, a button, a switch, etc. Output component 2050 may include a mechanism that outputs information to the operator, such as a display, a speaker, one or more light emitting diodes (LEDs), etc.

Communication interface 2060 may include any transceiver-like mechanism that enables device 2000 to communicate with other devices and/or systems. For example, communication interface 2060 may include an Ethernet interface, an optical interface, a coaxial interface, or the like. Communication interface 2060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 2000 may include more than one communication interface 2060. For instance, device 2000 may include an optical interface and an Ethernet interface.

Device 2000 may perform certain operations relating to one or more processes described above. Device 2000 may perform these operations in response to processor 2020 executing software instructions stored in a computer-readable medium, such as memory 2030. A computer-readable medium may be defined as a non-transitory memory device. A memory device may include space within a single physical memory device or spread across multiple physical memory devices. The software instructions may be read into memory 2030 from another computer-readable medium or from another device. The software instructions stored in memory 2030 may cause processor 2020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIGS. 3,5, 7-10, and 12-16, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, 4, 6, and 19), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a device, location information from a user device;
   determining, by the device, that the user device is in a vehicle, the determining being based on a traveling speed of the user device, as indicated by the location information;
   receiving, by the device, first sensor data from the user device, the first sensor data including sensor measurements of the user device when the user device is determined to be in the vehicle, based on the traveling speed of the user device, as indicated by the location information;
   generating a reference dataset based on the first sensor data;
   receiving, by the device, second sensor data regarding the user device;
   determining, by the device and based on the second sensor data, that a user of the user device is in the vehicle or is driving the vehicle, the determining including at least one of:
      comparing the second sensor data, received from the user device, with the reference dataset, the reference data set including reference data associated with users being present in or driving a vehicle, wherein comparing the second sensor data with the reference dataset is based on the generated reference dataset, or
      determining that a value of a measurement, received as part of the second sensor data, satisfies a threshold that is related to whether the user is in the vehicle or is driving the vehicle; and
   outputting, by the device, a particular control instruction to the user device based on determining that the user is in the vehicle or is driving the vehicle.

2. The method of claim 1, wherein outputting the particular control instruction causes the user device to begin tracking location information associated with the user device or to lock particular functions of the user device.

3. The method of claim 1, wherein the second sensor data includes at least one of:
   accelerometer data,
   gyroscope data,
   magnetometer data,
   barometer data,
   communications hardware data,
   location data,
   audio data,
   video data, or
   image data.

4. The method of claim 1, wherein the particular control instruction is a first particular control instruction, the method further comprising:
   determining that user has exited the vehicle based on additional sensor data and after determining that the user is in the vehicle or driving the vehicle; and
   outputting a second particular control instruction based on determining that the user has exited the vehicle.

5. The method of claim 1, wherein determining that the user of the user device is in the vehicle or is driving the vehicle includes determining that the user of the user device is in the vehicle or is driving when the user device does not output location information regarding the user device.

6. The method of claim 1, wherein determining that the user of the user device is in the vehicle or is driving the vehicle is further based on at least one of:
   gyroscope data or the accelerometer data, included as part of the second sensor data, indicating that the user has entered the vehicle,
   magnetometer data, included as part of the second sensor data, indicating that the user has entered the vehicle
   the magnetometer data, when an engine of the vehicle is started, indicating that the user is sitting in a front seat of the vehicle, or
   the gyroscope or the accelerometer data indicating that the user is in a driver side seat of the vehicle.

7. The method of claim 1 wherein determining that the user of the user device is in the vehicle or is driving the vehicle is further based on at least one of:
   an orientation of the user device, based on gyroscope data included as part of the second sensor data, indicating that the user device is located in the vehicle,
   accelerometer or gyroscope data, included as part of the second sensor data, indicating that the user is walking to or from the vehicle,
   information, included as part of the second sensor data, identifying that the user device is connected to a communications device associated with the vehicle,
   audio data, included as part of the second sensor data, indicating that the user has entered the vehicle,
   image data, included as part of the second sensor data, indicating that the user has entered the vehicle and is sitting in a passenger seat or a driver seat of the vehicle, or
   barometer data, included as part of the second sensor data, indicating that the vehicle is in motion.

8. A method comprising:
   receiving information indicating that a user device is in communication with a device associated with a vehicle;
   determining that the user device is in the vehicle, the determining being based on receiving the information indicating that the user device is in communication with the device associated with the vehicle;

receiving first sensor data, from the user device, the first sensor data including sensor measurements of the user device based on determining that the user device is in the vehicle;

generating a reference dataset based on the first sensor data;

receiving second sensor data regarding the user device;

determining, based on the second sensor data, that a user of the user device is in the vehicle or is driving the vehicle, the determining including at least one of:

comparing the second sensor data, received from the user device, with the reference dataset, the reference data set including reference data associated with users being present in or driving a vehicle, wherein comparing the sensor data with the reference dataset is based on the generated reference dataset, or determining that a value of a measurement, received as part of the second sensor data, satisfies a threshold that is related to whether the user is in the vehicle or driving the vehicle; and outputting a particular control instruction to the user device based on determining that the user is in the vehicle or is driving the vehicle.

9. The method of claim 8, wherein outputting the particular control instruction causes the user device to begin tracking location information associated with the user device or to lock particular functions of the user device.

10. The method of claim 8, wherein the particular control instruction is a first particular control instruction, the method further comprising:

determining that the user has exited the vehicle based on additional sensor data and after determining that the user is in the vehicle or driving the vehicle; and outputting a second particular control instruction based on determining that the user has exited the vehicle.

11. A system comprising:

a device, comprising:

a non-transitory memory device storing:

a plurality of processor-executable instructions; and a processor configured to execute the processor-executable instructions, wherein executing the processor-executable instructions causes the processor to:

receive location information from a user device;

determine that the user device is in a vehicle, based on a traveling speed of the user device, as indicated by the location information;

receive first sensor data from the user device, the first sensor data including sensor measurements of the user device when the user device is in the vehicle;

generate a reference dataset based on the first sensor data;

receive second sensor data regarding the user device;

determine, based on the second sensor data, that a user of the user device is in the vehicle or is driving the vehicle, wherein executing the processor-executable instructions, to determine that the user of the user device is in the vehicle or is driving the vehicle, causes the processor to:

compare the second sensor data, received from the user device, with the reference dataset, the reference dataset including reference data associated with users being present in or driving a vehicle, the comparison of the second sensor data with the reference dataset being based on the generated reference dataset, or determine that a value of a measurement, received as part of the sensor data, satisfies a threshold that is related to whether the user is in the vehicle or driving the vehicle; and output a particular control instruction to the user device based on determining that the user is in the vehicle or is driving the vehicle.

12. The system of claim 11, wherein executing the processor-executable instructions, to output the particular control instruction, causes the processor to cause the user device to begin tracking location information associated with the user device or to lock particular functions of the user device.

13. The system of claim 11, wherein the second sensor data includes at least one of:

accelerometer data, gyroscope data, magnetometer data, barometer data, communications hardware data, location data, audio data, video data, or image data.

14. The system of claim 11, wherein executing the processor-executable instructions, to determine that the user of the user device is in the vehicle or is driving the vehicle, causes the processor to determine that the user of the user device is in the vehicle or is driving when the user device does not output location information regarding the user device.

15. The system of claim 11, wherein executing the processor-executable instructions, to determine that the user of the user device is in the vehicle or is driving the vehicle, causes the processor to determine that the user of the user device is in the vehicle or is driving the vehicle based on at least one of:

gyroscope data or the accelerometer data, included as part of the second sensor data, indicating that the user has entered the vehicle, magnetometer data, included as part of the second sensor data, indicating that the user has entered the vehicle, the magnetometer data, when an engine of the vehicle is started, indicating that the user is sitting in a front seat of the vehicle, or the gyroscope or the accelerometer data indicating that the user is in a driver side seat of the vehicle.

16. The system of claim 11, wherein executing the processor-executable instructions, to determine that the user of the user device is in the vehicle or is driving the vehicle, causes the processor to determine that the user of the user device is in the vehicle or is driving the vehicle based on at least one of:

an orientation of the user device, based on gyroscope data included as part of the second sensor data, indicating that the user device is located in the vehicle, information, included as part of the second sensor data, identifying that the user device is connected to a communications device associated with the vehicle, audio data, included as part of the second sensor data, indicating that the user has entered the vehicle, image data, included as part of the second sensor data, indicating that the user has entered the vehicle and is sitting in a passenger seat or a driver seat of the vehicle, or barometer data, included as part of the second sensor data, indicating that the vehicle is in motion.

17. A system comprising:

a device, comprising:

a non-transitory memory device storing:

a plurality of processor-executable instructions; and a processor configured to execute the processor-executable instructions, wherein executing the processor-executable instructions causes the processor to:

receive, from a user device, location information identifying the location of the user device;

determine that the user device is in a vehicle based on a traveling speed of the user device as indicated by the location information;

receive first sensor data from the user device identifying sensor measurements of the user device when the user device is in the vehicle;

generate a reference dataset identifying the first sensor data;

receive second sensor data from the user device;

determine that a user of the user device is in the vehicle based on comparing the second sensor data with the reference dataset, and output a particular control instruction to the user device based on determining that the user is in the vehicle.

18. The system of claim 17, wherein executing the processor executable instructions, to generate the reference dataset, further causes the processor to generate the reference dataset identifying a plurality of first sensor data received from a plurality of respective user devices.

19. The system of claim 17, wherein executing the processor executable instructions, to determine that the user of the user device is in the vehicle, causes the processor to determine that the user of the user device is in the vehicle when the user device does not output location information regarding the user device.

20. The system of claim 17, wherein the particular control instruction causes the user device to begin tracking location information associated with the user device or to lock particular functions of the user device.

* * * * *